US011498064B2

(12) United States Patent
Tajima et al.

(10) Patent No.: US 11,498,064 B2
(45) Date of Patent: Nov. 15, 2022

(54) PHOTOMETRIC DISPENSING NOZZLE UNIT, PHOTOMETRIC DISPENSING APPARATUS, AND PHOTOMETRIC DISPENSING METHOD

(71) Applicant: Universal Bio Research Co., Ltd., Chiba (JP)

(72) Inventors: Hideji Tajima, Chiba (JP); Kazuhiro Nakamura, Chiba (JP); Yu Sugiyama, Chiba (JP)

(73) Assignee: Universal Bio Research Co., Ltd., Chiba (JP)

( * ) Notice: Subject to any disclaimer, the term of this patent is extended or adjusted under 35 U.S.C. 154(b) by 658 days.

(21) Appl. No.: 16/496,723

(22) PCT Filed: Mar. 28, 2018

(86) PCT No.: PCT/JP2018/012779
§ 371 (c)(1),
(2) Date: Sep. 23, 2019

(87) PCT Pub. No.: WO2018/181481
PCT Pub. Date: Oct. 4, 2018

(65) Prior Publication Data
US 2021/0106985 A1  Apr. 15, 2021

(30) Foreign Application Priority Data
Mar. 28, 2017 (JP) .............................. JP2017-063737

(51) Int. Cl.
*B01L 3/02* (2006.01)
*G01N 21/64* (2006.01)
(Continued)

(52) U.S. Cl.
CPC ........... *B01L 3/0217* (2013.01); *B01L 3/0275* (2013.01); *G01N 21/6408* (2013.01);
(Continued)

(58) Field of Classification Search
None
See application file for complete search history.

(56) References Cited

U.S. PATENT DOCUMENTS 5,478,526 A * 12/1995 Sakai ................. G01N 35/1016
422/68.1
5,919,706 A *  7/1999 Tajima ................. G01F 23/292
422/561
(Continued)

FOREIGN PATENT DOCUMENTS

EP  0666472  8/1995
EP  2628786  8/2013
(Continued)

OTHER PUBLICATIONS

International Search Report for PCT/JP2018/012779, dated Jun. 26, 2018.

*Primary Examiner* — Brian R Gordon
(74) *Attorney, Agent, or Firm* — Andrus Intellectual Property Law, LLP

(57) ABSTRACT

A photometric dispensing nozzle unit, a photometric dispensing apparatus, and a photometric dispensing method are for preventing an increase in apparatus scale and have a simple structure to be easily handled. A nozzle performs suction/discharge of gas through a distal end opening and can have a dispensing tip attached thereto. A light guide end portion is provided in the nozzle and can receive or irradiate light at a distal end of the nozzle. A dispensing cylinder has a cylinder having a cavity therein, a plunger that is slidable in the cavity, and a suction/discharge port that performs suction/discharge of gas. A suction/discharge flow path passes through the nozzle and communicates with the suction/discharge port and the distal end opening of the nozzle.

(Continued)

A light guide path is optically connected to the light guide end portion through the nozzle but not through the dispensing cylinder.

16 Claims, 16 Drawing Sheets

(51) Int. Cl.
  *G01N 21/76*  (2006.01)
  *G01N 35/10*  (2006.01)
(52) U.S. Cl.
  CPC ......... *G01N 21/6452* (2013.01); *G01N 21/76* (2013.01); *G01N 35/1016* (2013.01); *B01L 2200/025* (2013.01); *B01L 2200/146* (2013.01); *B01L 2300/0654* (2013.01); *B01L 2300/0832* (2013.01); *G01N 2021/6484* (2013.01); *G01N 2035/1044* (2013.01)

(56) References Cited

U.S. PATENT DOCUMENTS

| | | | | |
|---|---|---|---|---|
| 7,498,551 | B2 * | 3/2009 | Werner | G02B 21/0076 |
| | | | | 250/201.3 |
| 8,227,258 | B2 * | 7/2012 | Chang | G01N 35/00613 |
| | | | | 435/287.7 |
| 8,232,111 | B2 * | 7/2012 | Kusuura | B01L 3/021 |
| | | | | 422/520 |
| 8,649,605 | B2 * | 2/2014 | Franz | G01N 21/9027 |
| | | | | 382/190 |
| 9,221,046 | B2 | 12/2015 | Petrek et al. | |
| 9,481,906 | B2 * | 11/2016 | Tajima | G01N 35/10 |
| 9,556,477 | B2 * | 1/2017 | Tajima | G01N 35/1083 |
| 9,734,420 | B2 * | 8/2017 | Matthias | G01N 35/1016 |
| 9,857,308 | B2 * | 1/2018 | Tajima | G01N 21/76 |
| 9,857,388 | B2 * | 1/2018 | Tamezane | G01N 35/1002 |
| 10,005,594 | B2 * | 6/2018 | Tajima | B65D 35/02 |
| 10,139,348 | B2 * | 11/2018 | Tajima | G01N 21/0332 |
| 10,775,397 | B2 * | 9/2020 | Tajima | G01N 35/10 |
| 10,837,907 | B2 * | 11/2020 | Tajima | G01N 21/78 |
| 10,883,926 | B2 * | 1/2021 | Tajima | G01N 21/6428 |
| 10,976,253 | B2 * | 4/2021 | Tajima | G01N 21/253 |
| 11,001,087 | B2 * | 5/2021 | Rodriguez | B01L 3/0268 |
| 11,099,132 | B2 * | 8/2021 | Tajima | G01N 21/6452 |
| 2004/0241872 | A1 | 12/2004 | Wegrzyn et al. | |

FOREIGN PATENT DOCUMENTS

| | | |
|---|---|---|
| JP | S62-170852 | 7/1987 |
| JP | H0694584 | 4/1994 |
| JP | H0929111 | 2/1997 |
| JP | 2005-249521 | 9/2005 |
| JP | 2011-163771 | 8/2011 |
| JP | 2013-250191 | 12/2013 |
| WO | 9744671 | 11/1997 |
| WO | 9832002 | 7/1998 |
| WO | 2012-157685 | 11/2012 |

* cited by examiner

| OPERATION | LANE NUMBER | | | | | | | | AVE | MAX | MIN | SD | CV(%) |
|---|---|---|---|---|---|---|---|---|---|---|---|---|---|
| | 1 | 2 | 3 | 4 | 5 | 6 | 7 | 8 | | | | | |
| 1 | 18,657 | 20,038 | 20,016 | 18,942 | 18,664 | 19,486 | 20,798 | 17,195 | 19225 | 20,798 | 17,195 | 1112.7 | 5.79 |
| 2 | 18,251 | 20,110 | 20,047 | 19,617 | 18,749 | 19,540 | 20,805 | 17,203 | 19290 | 20,805 | 17,203 | 1161.1 | 6.02 |
| 3 | 18,227 | 20,098 | 20,137 | 19,694 | 18,832 | 19,638 | 20,884 | 17,244 | 19344 | 20,884 | 17,244 | 1177.0 | 6.08 |
| 4 | 18,248 | 20,073 | 20,177 | 19,637 | 18,844 | 19,614 | 20,874 | 17,280 | 19343 | 20,874 | 17,280 | 1161.1 | 6.00 |
| 5 | 18,265 | 20,078 | 20,199 | 19,647 | 18,873 | 19,613 | 20,918 | 17,302 | 19362 | 20,918 | 17,302 | 1162.8 | 6.01 |
| AVE | 18330 | 20079 | 20115 | 19507 | 18792 | 19578 | 20856 | 17245 | 19313 | | | | |
| MAX | 18,657 | 20,110 | 20,199 | 19,694 | 18,873 | 19,638 | 20,918 | 17,302 | | 20,918 | | | |
| MIN | 18,227 | 20,038 | 20,016 | 18,942 | 18,664 | 19,486 | 20,798 | 17,195 | | | 17,195 | | |
| SD | 183.5 | 27.6 | 80.3 | 317.3 | 85.3 | 63.3 | 52.2 | 46.7 | | | | 1095.5 | |
| CV(%) | 1.00 | 0.14 | 0.40 | 1.63 | 0.45 | 0.32 | 0.25 | 0.27 | | | | | 5.67 |

FIG. 16
(1) OPERATION 1
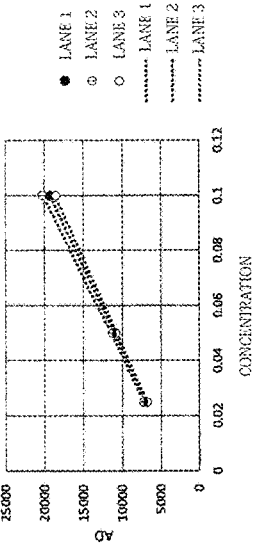
(2) OPERATION 2
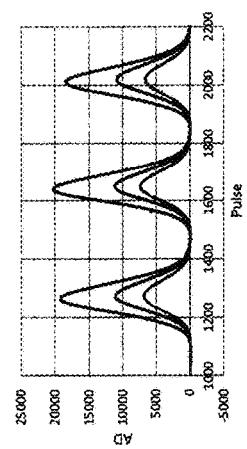
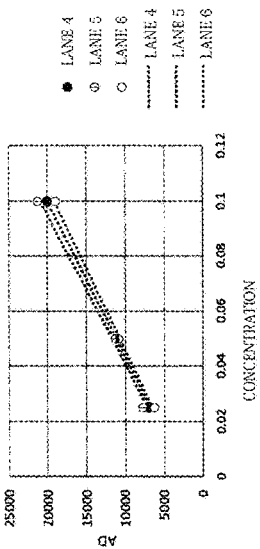
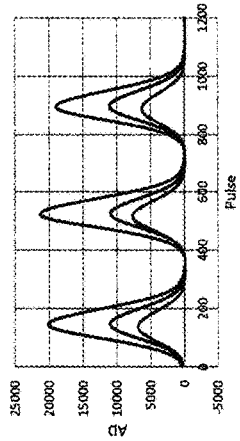

PHOTOMETRIC DISPENSING NOZZLE UNIT, PHOTOMETRIC DISPENSING APPARATUS, AND PHOTOMETRIC DISPENSING METHOD

CROSS-REFERENCE TO RELATED APPLICATIONS

This application is the U.S. national stage application of International Application PCT/JP2018/012779, filed Mar. 28, 2018, which international application was published on Oct. 4, 2018, as International Publication WO 2018/181481 in the Japanese language. The International Application claims priority of Japanese Patent Application No. 2017-063737, filed Mar. 28, 2017. The international application and Japanese application are both incorporated herein by reference, in entirety.

TECHNICAL FIELD

The present invention relates to a photometric dispensing nozzle unit, a photometric dispensing apparatus, and a photometric dispensing method, and specifically to a photometric dispensing nozzle unit, a photometric dispensing apparatus, and a photometric dispensing method, making it possible to perform a treatment such as dispensing, stirring, or moving by discharging/sucking a target such as a specimen or a reagent solution stored in a container using a dispensing tip attached to a nozzle, and also making it possible to optically measure the target stored in the container.

BACKGROUND ART

In recent years, as an apparatus for analyzing a specimen, based on Magtration (registered trademark) technology proposed by the present applicant, there is known an apparatus using a magnetic force function-equipped dispensing apparatus in which a magnetic force means is incorporated into a dispensing apparatus so as to make it possible to apply a magnetic field to the inside of a dispensing tip. The apparatus includes in a container group including a plurality of containers to store a specimen, various reagents, and the like. A disposable dispensing tip in which a distal end can be inserted into the containers is detachably attached to a nozzle, the distal end of the dispensing tip is inserted into the containers, a predetermined amount of liquid sample is sucked and stored using a gas suction/discharge mechanism to make it possible to discharge the liquid sample, and the sample is thereby dispensed, blended, or the like. In addition, using a magnetic carrier and the magnetic force means, a target substance is captured by the magnetic carrier from the inside of the sample to be adsorbed by an inner wall of the dispensing tip, and the target substance is separated and extracted.

In addition, the present applicant provides an apparatus in which a light measuring device is further incorporated into the magnetic force function-equipped dispensing apparatus, and makes it possible to consistently perform from extraction of a target substance contained in a sample to optical measurement or detection of a labeled target substance.

However, in the conventional apparatus, mechanisms and parts that operate almost independently are provided in each of a portion of the dispensing apparatus that extracts a target substance from a sample and the light measuring device that performs light measurement by labeling an extracted target substance. An apparatus scale as a whole may be increased, and a structure may be complicated.

In addition, in the conventional apparatus, in a case where a treatment of extracting a target substance such as a nucleic acid from a sample, amplifying the extracted target substance by PCR or the like, and performing measurement of fluorescence or the like at this time is consistently performed, there is a large difference in the amount of liquid to be dispensed. Therefore, it is necessary to prepare various volumes of dispensing cylinders or to exchange a dispensing apparatus due to the difference in liquid amount. An apparatus scale may also be increased, the number of parts may be increased, a treatment may be complicated, and treatment time may be long.

For example, in a case of performing a treatment of extracting a nucleic acid from a sample and determining a base sequence of the nucleic acid, a large amount, for example, about 1000 μL of liquid is used for extracting the nucleic acid, while a minute amount, for example, only about 5 μL of liquid is used for amplifying the nucleic acid.

Therefore, for example, it is necessary to cope with a wide range of dispensing amount of 0.5 μL to 1000 μL. Conventionally, a treatment for a minute amount is also performed using a cylinder apparatus for a large amount. Alternatively, a dispensing cylinder can be exchanged, and two types of cylinder members having different cylinder inner diameters and different piston member outer diameters, which are a minute volume (for example, 0.5 μL to 30 μL) cylinder including a small inner diameter cylinder and a small diameter piston member, and a large volume (for example, 20 μL to 1000 μL) cylinder including a large inner diameter cylinder and a large diameter piston member, are exchanged and used in some cases.

Furthermore, a treatment for a minute amount and a treatment for a large amount are performed using a cylinder of a mechanism coping with both a minute amount and a large amount using a single cylinder.

However, in a case where a treatment for a minute amount is also performed using a cylinder for a large amount, it may be impossible to obtain high accuracy for the minute amount. In a case where a dispensing cylinder is exchanged and used, even if high accuracy can be obtained, a large burden is imposed on a user, and a dispensing treatment may be interrupted to make it impossible to perform an efficient and rapid treatment.

Meanwhile, in a case where a treatment for a minute amount and a treatment for a large amount are performed using a cylinder of a mechanism coping with both a minute amount and a large amount, the total length of a plunger and a cylinder is large. Therefore, an apparatus scale is large, and it is difficult for a user to handle the apparatus. In addition, the mechanism is complicated, it takes time and labor to manufacture the apparatus, and the apparatus may be expensive disadvantageously.

Therefore, in a case where a nozzle and a dispensing cylinder are integrally formed such that both measurement of light and suction/discharge of liquid can be performed, it is necessary to prepare various types of nozzle units depending on a difference in liquid amount and contents of measurement, and handling may be complicated.

CITATION LIST

Patent Literature

Patent Literature 1: WO 97/44671
Patent Literature 2: WO 2012/157685 A1

Patent Literature 3: JP 2013-250191 A
Patent Literature 4: JP 2011-163771 A
Patent Literature 5: JP 6-94584 A
Patent Literature 6: JP 2005-249521 A
Patent Literature 7: JP 9-29111 A

SUMMARY OF INVENTION

Technical Problem

Therefore, the present invention has been achieved in order to solve the above problems. A first object of the present invention is to provide a photometric dispensing nozzle unit, a photometric dispensing apparatus, and a photometric dispensing method, suppressing an increase in apparatus scale and the number of parts, having a simple and compact structure, and being inexpensive by making not only a dispensing treatment but also a photometric treatment possible using a common nozzle.

A second object of the present invention is to provide a versatile photometric dispensing nozzle unit, photometric dispensing apparatus, and photometric dispensing method, making a dispensing treatment of both a minute amount of liquid and a large amount of liquid possible using a common nozzle.

A third object of the present invention is to provide a photometric dispensing nozzle unit, a photometric dispensing apparatus, and a photometric dispensing method, which make it easy for a user to exchange a dispensing nozzle unit and a dispensing cylinder and are easily handled.

Solution to Problem

A first aspect of the present invention provides a photometric dispensing nozzle unit comprising: a nozzle having a distal end opening through which suction/discharge of gas is performed and to which a dispensing tip is attached; a light guide end portion which is provided in the nozzle and in which light is received or irradiated at a distal end of the nozzle; a dispensing cylinder including a cylinder having a cavity therein, a plunger that is slidable in the cavity, and a suction/discharge port through which suction/discharge of gas is performed; a suction/discharge flow path that passes through the nozzle and allows the suction/discharge port to communicate with the distal end opening of the nozzle; and a light guide path optically connected to the light guide end portion through the nozzle without through the dispensing cylinder.

Here, the "dispensing tip" includes, for example, a thick pipe portion, a thin pipe portion, and a transition portion communicating the thick pipe portion with the thin pipe portion. The thick pipe portion preferably has an attachment opening to be fitted to a lower end of the nozzle and attached to the nozzle. The thin pipe portion preferably has a distal end opening through which liquid can flow in and out by suction/discharge of gas by the suction/discharge mechanism. The dispensing tip and the nozzle are made of, for example, an organic substance including a resin such as polypropylene, polystyrene, polyester, or polyacrylate, glass, ceramics, a metal such as stainless steel, a metal compound, or an inorganic substance such as a semiconductor.

The "light guide end portion" is one end portion of the light guide path and is an end portion on a photometric target side. The other end of the light guide path is an end portion on a light measuring device side. The light guide end portion irradiates light (the light guide end portion is particularly referred to as "irradiation end" in this case), receives light (the light guide end portion is particularly referred to as "light receiving end" in this case), or irradiates and receives light (the light guide end portion is particularly referred to as "pair of irradiation end and light receiving end"). The light guide end portion may have a lens optically connected to the light guide path. The "light guide path" is a light transmitting optical member that can guide light, and is preferably, for example, a flexible and light transmitting long member such as an optical fiber (bundle). The light guide path may include an irradiation optical fiber, a light receiving optical fiber, or both thereof. The "flow path" is a passage through which gas flows, and examples thereof include a hole, a groove, a gap, a conduit, a pipe, and a recess. The "nozzle" has a hole therein in an axial direction thereof, and communicates with the distal end opening. The nozzle is, for example, substantially tubular, and preferably substantially cylindrical. A "distal end" surface of the nozzle and a "rear end" surface of thereof are preferably provided so as to face each other in the axial direction.

The "suction/discharge port" is preferably formed ahead of a distal end of a plunger of the dispensing cylinder at a bottom dead center of a stroke of the plunger, or at a cavity ahead of a suction/discharge section where suction/discharge is performed by sliding the plunger in the cavity of the cylinder. As described later, the suction/discharge port is preferably bored on a side wall of the dispensing cylinder.

Note that the nozzle further has a vent hole communicating with the distal end opening in addition to the distal end opening. For example, preferably, the photometric dispensing nozzle unit further includes a light guide path end fixing member (a ferrule unit or the like described later) that can be inserted and fitted into a through hole in the axial direction, serving as the hole of the nozzle, and has the light guide path end fixed to the inside thereof, the suction/discharge flow path has an in-nozzle flow path formed between an outer surface of the nozzle and an outer surface of the light guide path end fixing member so as to communicate with the distal end opening and the vent hole, and the light guide end portion is provided inside the light guide path end fixing member or attached to a distal end thereof so as to be in non-contact with the nozzle. As a result, the light guide path and the suction/discharge flow path are not in contact with each other. In this case, the light guide end portion occupies the center of the distal end opening, and the distal end opening occupies the periphery thereof. Therefore, optical measurement can be reliably performed.

By forming a gap portion between an inner wall surface of the through hole of the nozzle and an outer surface of the light guide path end fixing member as the in-nozzle flow path, the outer surface of the light guide path end fixing member can be processed easily, for example, a suction/discharge flow path can be easily formed by cutting or the like. Note that the light guide end portion includes the "light guide path end", and may include, in addition to the light guide path end itself, the light guide path end and an optical system such as a rod lens optically connected thereto. Note that examples of the in-nozzle flow path, that is, the flow path passing through a region sandwiched between the outer surface of the nozzle and the outer surface of the light guide path end fixing member further include a flow path in which at least a partial region is formed in a side wall of the nozzle, and a gap, a recess, and a groove formed by scraping a an inner wall surface of the nozzle.

In this case, the "suction/discharge flow path" is, as a whole, a flow path connecting a suction/discharge port, the vent hole, a connecting flow path connecting the suction/ discharge port with the vent hole to allow the suction/discharge port to communicate with the vent hole, and the gap portion with, and the distal end opening to each other to allow these to communicate with each other. Usually, the light guide path is not formed coaxially with the nozzle so as to pass through the dispensing cylinder provided above the nozzle, but is "optically connected to the light guide end portion through the nozzle without through the dispensing cylinder".

A second aspect of the present invention provides a photometric dispensing nozzle unit further including a flow path built-in support member in which the nozzle and the dispensing cylinder are independently and detachably attached and supported in parallel, and a partial region of the suction/discharge flow path is formed therein.

Preferably, the light guide path extends in the axial direction of the tubular nozzle, while the suction/discharge flow path deviates from the axial direction of the nozzle. This makes it possible to reduce obstruction of light guide and to prevent deterioration of the light guide path formed of an optical fiber or the like. Therefore, the nozzle and the dispensing cylinder are provided in parallel. This makes it possible to suppress a length from a distal end of the dispensing tip attached to the nozzle to a rear end of the plunger of the dispensing cylinder as compared to a case where the nozzle and the dispensing cylinder are provided in series, and to prevent an increase in apparatus scale. In particular, this is particularly effective in a case where a nozzle extended in the axial direction by providing a light guide end portion and a light guide path therein, and a dispensing cylinder also extended in the axial direction so as to correspond to various volumes are combined.

The "partial region of the suction/discharge flow path" is, for example, a portion formed outside the nozzle and outside the dispensing cylinder, and excludes a portion formed inside the nozzle or inside the dispensing cylinder.

"The nozzle and the dispensing cylinder are independently and detachably attached and supported in parallel". Therefore, only the dispensing cylinder or only the nozzle can be exchanged.

"Parallel" means a case where the axis of the nozzle and the axis of the dispensing cylinder are in parallel at a predetermined distance apart from each other without passing through each other. Examples of "attachment" include screwing, fitting, and a combination thereof. According to the present invention, by providing the flow path built-in support member to which the nozzle and the dispensing cylinder can be attached independently, the dispensing cylinder can be exchanged for an optimal type of dispensing cylinder that can handle a liquid amount according to a treatment purpose. Therefore, the present invention is versatile. In addition, since a partial region of the suction/discharge flow path is formed in the flow path built-in support member, not only the nozzle and the dispensing cylinder but also the suction/discharge flow path is supported. Therefore, the photometric dispensing nozzle unit can be securely supported to enhance rigidity. In addition, preferably, by attaching the nozzle and the dispensing cylinder to the flow path built-in support member, the flow path formed in the nozzle, the cavity in the dispensing cylinder, and a partial region thereof simultaneously communicate with each other to complete the suction/discharge flow path.

Note that in the partial region formed in the flow path built-in support member, the connecting flow path connected to and communicating with the vent hole and the suction/discharge port is provided simultaneously with the attachment of the nozzle and the dispensing cylinder.

A third aspect of the present invention provides a photometric dispensing nozzle unit in which the nozzle has a nozzle lateral hole formed through a side wall thereof, the suction/discharge port is a cylinder lateral hole formed through a side wall of the cylinder, and the partial region of the suction/discharge flow path has a connecting flow path formed so as to allow the nozzle lateral hole of the nozzle attached to the flow path built-in support member to communicate with the cylinder lateral hole of the dispensing cylinder attached to the flow path built-in support member.

Here, the cylinder lateral hole is preferably formed in a side wall of a lower end portion of the dispensing cylinder, and furthermore, in a side wall of a cavity below the distal end of a plunger of the dispensing cylinder at a bottom dead center of a stroke of the plunger. Furthermore, the nozzle lateral hole corresponds to the vent hole.

In this case, as the gap portion, it is preferable to form a gap surrounded by an inner wall surface of the through hole of the nozzle and a flat surface or a curved surface formed so as to cut out a part of an outer surface of the light guide path end fixing member in the axial direction toward the distal end including the nozzle lateral hole position so as to communicate with the distal end opening and the nozzle lateral hole, and open to the outside at the distal end opening. In this case, a part of the outer surface of the light guide path end fixing member may include the curved surface or the flat surface formed so as to cut out the part of the outer surface of the light guide path end fixing member in an outer peripheral direction.

According to the present invention, the connecting flow path is formed in the flow path built-in support member, and is securely supported together with the nozzle and the dispensing cylinder. Therefore, the connecting flow path is formed firmly. In addition, the connecting flow path can be formed linearly, and communication is possible with the shortest distance. Therefore, a dead volume can be reduced, and a treatment with high responsiveness can be performed.

A fourth aspect of the invention provides a photometric dispensing nozzle unit in which the flow path built-in support member includes: a flow path built-in support block; a nozzle attachment longitudinal hole and a cylinder attachment longitudinal hole bored in the flow path built-in support block; and the connecting flow path formed in the flow path built-in support block and allowing the nozzle attachment longitudinal hole to communicate with the cylinder attachment longitudinal hole, the nozzle is closely attached to the nozzle attachment longitudinal hole, the dispensing cylinder is closely attached to the cylinder attachment longitudinal hole, and the connecting flow path allows the nozzle lateral hole of the attached nozzle to communicate with the cylinder lateral hole of the attached dispensing cylinder.

In this case, the connecting flow path can be formed linearly and horizontally, and therefore the nozzle communicates with the dispensing cylinder with the shortest distance. A dead volume in the flow path can be reduced, and a highly responsive suction/discharge treatment can be performed. Note that the nozzle attachment longitudinal hole is in close contact with the nozzle from a lower side, and the cylinder attachment longitudinal hole is in close contact with the dispensing cylinder from an upper side to make attachment easy.

A fifth aspect of the present invention provides a photometric dispensing nozzle unit in which any one of close contact surfaces between the nozzles and the nozzle attachment longitudinal holes and any one of close contact surfaces between the dispensing cylinders and the cylinder attachment longitudinal holes each have a seal member vertically partitioning each of the close contact surfaces so as to sandwich the cylinder lateral holes and the nozzle lateral holes at upper and lower positions.

This makes it possible to connect the connecting flow path to a portion of the suction/discharge flow path other than the connecting flow path in a state in which high airtightness is secured. In a case where the nozzle, the nozzle attachment longitudinal hole, the dispensing cylinder, and the cylinder attachment longitudinal hole have axes in the vertical direction, a seal member is provided so as to surround the axes. Note that in a case where a second nozzle lateral hole is formed, the seal member is preferably provided so as to sandwich also the nozzle lateral hole and the second nozzle lateral hole at upper and lower positions.

In a fitting portion between the outer surface of the light guide path end fixing member and the inner wall surface of the nozzle above the nozzle lateral hole, a seal member surrounding the axes is preferably provided so as to partition the fitting surface on either the outer surface or the inner wall surface. This makes it possible to secure airtightness to the opening at a rear end of the nozzle.

Here, as described later, examples of the seal member include an O-ring, a D-ring, an X packing, and a Y packing. The "O-ring", "D-ring", "X packing", and "Y packing" are ring-shaped members having O-shaped, D-shaped, X-shaped, and Y-shaped cross-sections, respectively, and members provided in grooves formed on an inner peripheral surface or an outer peripheral surface in a peripheral direction (for example, O-ring or D-ring) or provided without grooves, made of an elastic material, metal, or the like, and used for sealing gas or liquid. In a case where the seal member is provided on an inner peripheral surface, the seal member is provided so as to generate a compressive force in a radial direction. In a case where the seal member is provided on an outer peripheral surface of a column, the seal member is provided so as to generate an expanding force in a radial direction.

The suction/discharge flow path is preferably formed so as to pass through a region sandwiched between the outer surface of the light guide path end fixing member and the inner wall surface of the nozzle.

A sixth aspect of the present invention provides a photometric dispensing nozzle unit further including pressure sensor communicating with the distal end opening of the nozzle, in which the side wall of the nozzle has a second nozzle lateral hole passing through the side wall, the pressure sensor communicates with the distal end opening through the second nozzle lateral hole, the flow path built-in support block of the flow path built-in support member further has a pressure sensor attachment hole with which the pressure sensor is independently and detachably attached, and a pressure sensor flow path allowing the attached pressure sensor to communicate with the second nozzle lateral hole is formed.

In this case, the second nozzle lateral hole is formed in a region sandwiched by the seal member like the nozzle lateral hole. This makes it possible to secure high airtightness for connection between the pressure sensor flow path and the nozzle.

A seventh aspect of the present invention provides a photometric dispensing nozzle unit in which the cavity of the dispensing cylinder has a large diameter region having a large diameter inner peripheral surface, and a small diameter region formed on the suction/discharge port side of the large diameter region and having a small diameter inner peripheral surface, the plunger has a thick shaft portion that is slidable in the large diameter region, and a thin shaft portion that protrudes from a distal end surface of the thick shaft portion in the axial direction and is slidable in the small diameter region, a play region in which the thick shaft portion is configured to move with a play in the axial direction is formed between the large diameter region and the small diameter region, and the suction/discharge port is formed so as to be located in a cavity ahead of the small diameter region.

Here, "large diameter" refers to a diameter larger than "small diameter", and the thick shaft portion and the thin shaft portion are formed in one plunger. The large diameter region and the small diameter region are preferably cylindrical. The thick shaft portion and the thin shaft portion are preferably columnar. These are formed coaxially.

The "thick shaft" represents a thicker shaft than the "thin shaft". The stroke of the plunger, that is the stroke of the thick shaft portion" refers to a distance (hereinafter referred to as "D") between a top dead center (an upper limit position of the thick shaft portion) and a bottom dead center (a lower limit position of the thick shaft portion) in the axial direction when the thick shaft portion performs a vertical movement. The length of the thin shaft portion in the axial direction is shorter than the stroke of the plunger, and does not necessarily coincide with the total length (hereinafter referred to as "D0") of the play region and the large diameter region in the axial direction from the bottom dead center. This is because there is a thickness (d1) of the thick shaft portion. The "axis" is a "central axis" or a "symmetry axis" extending through the cavity or the like.

Here, a moving distance from a bottom dead center of the thick shaft portion to a distal end surface of the thick shaft portion in the axial direction is represented by d ($d \le D \le D0 - d1$). A sum of the lengths of the small diameter region and the cavity to the position of the suction/discharge port ahead of the small diameter region along the axis is represented by d2. Here, a portion that can be inserted into the small diameter region in the plunger may be included in the thin shaft portion even if the portion does not slide. A portion that cannot be inserted into the small diameter region but can be inserted into the large diameter region in the plunger may be included in the thick shaft portion even if the portion does not slide. The length of the thin shaft portion needs to be shorter than d2 because a distal end of the thin shaft portion should not protrude from the nozzle. In a case where a distance from a bottom dead center of a distal end surface of the thick shaft portion is represented by d, a distance from a bottom dead center of the thin shaft portion is also represented by d for the thin shaft portion. In this case, in a case where the thick shaft portion is located at a bottom dead center, the thin shaft portion is also located at a bottom dead center thereof. Meanwhile, an upper end of the small diameter region has the largest liquid amount as the minute amount as in the thick shaft portion.

Here, the "play region" is a region not sealed with the thick shaft portion (hence also with the thin shaft portion), and is a maximum diameter region (entire periphery play region) having an inner peripheral surface having an inner diameter of a maximum diameter larger than the large diameter over the entire periphery or a partial play region, for example, a region in which grooves in the axial direction are formed on an inner peripheral surface of the region. In this region, the seal member (a member having a function of sealing gas, that is, an airtight function, for example, an O-ring, a D-ring, an X packing, or a Y packing) does not function. Note that here, "capable of moving with a play (in a certain region)" means that movement is possible with a resistance (received from that region) smaller than a resistance received at the time of sliding. More specifically, for example, "capable of moving with a play (in a certain region)" means a case where a resistance received from the play region when the thick shaft portion moves in the play region is smaller (including 0) than a resistance (considered to be smaller than a resistance received from the large diameter region when the thick shaft portion slides in the large diameter region) received from the small diameter region when the thin shaft portion slides in the small diameter region.

Therefore, in addition to the case where the seal member is provided so as to surround the axis in a peripheral direction on each inner peripheral surface of the large diameter region or the small diameter region, the seal member may be provided so as to surround the axis in a peripheral direction on an outer peripheral surface of the thick shaft portion or the thin shaft portion. That is, the seal member only needs to be (1) provided in the thin shaft portion and the thick shaft portion, (2) provided in the small diameter region and the thick shaft portion, (3) provided in the thin shaft portion and the large diameter region, or (4) provided in the small diameter region and the large diameter region.

In the case of (1), if the width of the seal member in the axial direction is negligibly small (the same applies hereinafter), the length (d0) of the play region in the axial direction needs to be larger than the sum of the length (d1) from a distal end surface of the thick shaft portion to a sealing position of the seal member of the thick shaft portion in the axial direction and the length (d3) from a distal end surface of the thick shaft portion to a sealing position of the seal member of the thin shaft portion in the axial direction. That is, $d0 \geq d1+d3$ is satisfied.

In the case of (2), the length (d0) of the play region in the axial direction satisfies $d0+d4 \geq d1+d3$ if a distance from a lower end of the play region to a sealing position of the seal member in the small diameter region is represented by d4, a length of a sliding portion of the thin shaft portion in the axial direction is represented by d3, and a distance from a distal end surface of the thick shaft portion to a sealing position of the seal member is represented by d1. Note that in FIG. 8(b), when d4=0 is considered approximately, $d0=d1+d3$ is substantially satisfied as a play region having the shortest length in the axial direction.

In the case of (3), the length (d0) of the play region in the axial direction satisfies $d0+d5 \geq d1+d3$ if a distance from an upper end of the play region to a sealing position of the seal member in the large diameter region is represented by d5, a length of a sliding portion of the thick shaft portion in the axial direction is represented by d1, and a distance from a distal end surface of the thick shaft portion to a sealing position of the seal member of the thin shaft portion is represented by d3.

In the case of (4), the length (d0) of the play region in the axial direction satisfies $d0+d4+d5 \geq d1+d3$ if a distance from an upper end of the play region to the sealing position in the large diameter region is represented by d5, a distance from a lower end of the play region to a sealing position in the small diameter region is represented by d4, a length of a sliding portion of the thick shaft portion in the axial direction is represented by d1, and a length of a sliding portion of the thin shaft portion in the axial direction is represented by d3.

Therefore, when the thin shaft portion slides in the small diameter region, the thick shaft portion moves with a play or partially moves with a play in the play region in the axial direction. As a result, it is possible to prevent an increase in driving force to the plunger due to vacuuming in a region surrounded by the play region, the thick shaft portion, and the thin shaft portion, and to achieve smooth driving of the plunger while the thin shaft portion slides in the small diameter region.

In order to further make suction possible by sliding of the thick shaft portion in a state where the thin shaft portion is withdrawn from the small diameter region, the stroke (D) of the plunger needs to be longer than the length (d3). Therefore, conditions of relational formulas of $d2>d3$ and $d>d0>d3$ are required. In this case, in a large amount suction/discharge section, gas corresponding to $(d-d0) \times S1$ (large diameter cross-sectional area) is sucked into the large diameter region, and a large amount of liquid corresponding thereto is sucked into a dispensing tip. Meanwhile, in a minute amount suction/discharge section, $0 \leq d \leq d3 < d0$ is satisfied, gas corresponding to $d \times S2$ (small diameter cross-sectional area) can be sucked, and a minute amount of liquid is sucked into the dispensing tip in accordance therewith.

The large diameter region is cylindrical, the large diameter is, for example, 6 mm to 15 mm and preferably 10 mm, the length of the large diameter region is, for example, 10 mm to 50 mm and preferably 30 mm, and therefore the volume thereof is about 200 µL to about 8500 µL.

The small diameter region is tubular, the small diameter is, for example, 1 mm to 3 mm and preferably, for example, 1.5 mm, and the length (d3) from a distal end surface (or a sealing position) of the seal member of the thin shaft portion to a distal end surface of the thick shaft portion in the axial direction is, for example, 3 mm to 30 mm and preferably 15.3 mm, and therefore the volume thereof is about 2 µL to about 200 µL. As described later, if this amount corresponds to a threshold value, the minute amount is equal to or less than this volume, and is preferably, for example, about 26.5 µL or less. In this case, the large amount is, for example, about 27 µL to about 2000 µL. A material of the dispensing cylinder is glass, metal, resin, or the like, and examples thereof include polystyrene, polyester, and polypropylene (P.P).

In the present invention, when the plunger is raised in the axial direction by a distance d ($d \leq d3 < d0$) from a position where a distal end surface of the thick shaft portion of the plunger is located at a bottom dead center, the seal member of the thick shaft portion is raised in the play region. During the movement, the thin shaft portion maintains a state in which communication between the small diameter region and the large diameter region is disconnected. Therefore, gas sucked from the nozzle stays in the small diameter region. Therefore, into the dispensing tip attached to the nozzle, a minute amount of liquid corresponding to the dispensing tip flows. When the plunger is lowered from this position by the d ($\leq d3$) and returned to the bottom dead center, the sucked gas is discharged from the nozzle, and a minute amount of liquid sucked into the dispensing tip attached to the nozzle flows out. This is a reason why a minute amount of liquid can be sucked and discharged.

Meanwhile, when the plunger is raised in the axial direction by a distance d from the bottom dead center of the distal end surface of the thick shaft portion of the plunger beyond the position of the length (d3) of the thin shaft portion in the axial direction such that d satisfies $d3<d0-d1<d \leq D \leq D0-d1$, the thin shaft portion is withdrawn from the small diameter region, disconnection between the large diameter region and the small diameter region by the thin shaft portion is released, the small diameter region and the large diameter region communicate with each other, the gas sucked from the nozzle into the large diameter region reaches the large diameter region, and a large amount of liquid flows into the dispensing tip attached to the nozzle. When the plunger is lowered to the bottom dead center after reaching the position d=D, gas corresponding to the (D−d0)×S1 is discharged from the nozzle through the small diameter region, and a large amount of liquid can be sucked and discharged.

That is, a portion from the bottom dead center of the plunger to a position of the length (d3) in the axial direction from the distal end surface (or sealing position) of the seal member of the thin shaft portion to the distal end surface of the thick shaft portion is the minute amount suction/discharge section. A portion from a position of the length (d0−d1) from the bottom dead center of the plunger to a position of the top dead center (D) of the stroke is the large amount suction/discharge section.

In order to drive the dispensing cylinder, a stepping motor or the like is used as a driving source. During use, the plunger is reciprocated in the axial direction using, for example, a stepping motor as a suction/discharge driving unit described later. Switching between the large amount suction/discharge section and the minute amount suction/discharge section of the dispensing cylinder is performed by switching a stroke of the stepping motor. Note that in the thick shaft portion, a rod portion formed thinner than the thick shaft portion is provided so as to extend in the axial direction opposite to the suction/discharge port and to protrude outward from the plunger hole formed at an end opposite to the suction/discharge port. The plunger is driven so as to be able to reciprocate with a stroke designated by the stepping motor. The rod portion is provided so as to slide with the plunger hole.

In this case, at a boundary between the large diameter region and the maximum diameter region, at least one step projecting outward or a reversely tapered inclined surface is formed toward the suction/discharge port on an inner wall surface of the cavity so as to partition the inner wall surface. In this case, the thick shaft portion is formed so as to come into close contact with a step or an inclined surface provided between the maximum diameter region and the small diameter region at a bottom dead center of the plunger, and the entire thin shaft portion is inserted into the small diameter region at this position as described above. Note that the seventh aspect of the invention can also be achieved as an invention of a dispensing cylinder, independently of the photometric dispensing apparatus.

An eighth aspect of the invention provides a photometric dispensing apparatus including: one or more container groups each including a reaction container, a liquid storing unit or a dispensing tip storing unit; one or more photometric dispensing nozzle units each including: a nozzle which performs suction/discharge of gas through a distal end opening and to which a dispensing tip is attached, a dispensing cylinder including a cylinder having a cavity therein and a plunger that slides in the cavity and having a gas suction/discharge port, and a suction/discharge flow path allowing the suction/discharge port to communicate with the distal end opening through the nozzle; a nozzle moving mechanism that is configured to move the nozzle relatively to the container groups; a suction/discharge driving unit that moves the plunger of the dispensing cylinder in a vertical direction and makes it possible for the dispensing tip attached to the nozzle to simultaneously suction liquid from the container groups and to simultaneously discharge liquid to the container groups; a light measuring device that converts at least received light into digital data; and a photometric dispensing control unit that controls a dispensing treatment or a photometric treatment for the nozzle moving mechanism, the suction/discharge driving unit, and the light measuring device, in which the nozzle has a light guide end portion capable of receiving or irradiating light at a distal end of the nozzle, and a light guide path optically connected to the light guide end portion through the nozzle without through the dispensing cylinder, and the light measuring device is optically connected to the light guide path.

Here, each component can be limited by the description of the second to seventh aspects of the invention. The nozzle, the dispensing cylinder, the suction/discharge flow path, the light guide end portion, the light guide path, the suction/discharge driving unit, and the light measuring device, included in the photometric dispensing nozzle unit, are preferably provided in a nozzle head. In this case, the nozzle moving mechanism preferably includes a nozzle head moving mechanism that can move the nozzle by moving the nozzle head.

The "light measuring device" is, for example, capable of measuring fluorescence and chemiluminescence, and includes a photoelectric conversion unit including at least an imaging sensor such as a light receiving element, a light receiving element array, a CCD image sensor, or a CMOS image sensor, and also includes an optical filter. In a case of fluorescence, the light measuring device includes a light emitting element and a light emitting element array as an irradiation source of one or more types of excitation light, or an optical filter. The "photoelectric conversion unit" is a device utilizing a photoelectric effect, and includes a photoelectric element such as a photodiode or a phototransistor, and further includes a photon counting sensor having a multiplication effect, such as a photomultiplier tube or an avalanche photodiode (APD).

Note that the light measuring device is, for example, a photometric dispensing apparatus including: a connection end array in which connection ends of the other ends of the one or more light guide paths are arranged along a predetermined path; and an array moving mechanism that relatively moves the connection ends and measurement ends of the measuring device along the predetermined path to sequentially connect the ends. Here, the connection end array and the array moving mechanism are preferably provided in the nozzle head.

If a pair of an irradiation end and a light receiving end is provided as the light guide end portion, the connection end array is formed so as to supply light for irradiation to the irradiation end to obtain the intensity of light received by the light receiving end. That is, the light measuring device includes one or more light sources and one or more photoelectric conversion units. In this case, as the connection ends, one or more first connection ends optically connected to the one or more irradiation ends through an irradiation light guide path, and one or more second connection ends optically connected to the one or more light receiving ends through a light receiving light guide path are arranged along respective predetermined paths. In addition, the measuring device includes the array moving mechanism that relatively moves the connection end arrays along the predetermined paths such that one or more first measurement ends optically connected to the one or more light sources of the measuring device can be sequentially connected to the first connection ends of the connection end array, and one or more second measurement ends optically connected to the one or more photoelectric conversion units of the measuring device can be sequentially connected to the second connection ends of the connection end array. In this case, for example, the pair of the first measurement end and the second measurement end corresponding to the pair of the irradiation end and the light receiving end is arranged on a measurement end array surface of the measurement end array arranged on the measurement end array surface. Similarly, the pair of the first connection end and the second connection end corresponding to the pair of the irradiation end and the light receiving end is arranged on a connection end array surface of the connection end array. The array moving mechanism relatively moves the connection end array surface and the measurement end array surface in a proximity (non-contact) manner or in a sliding manner, and makes simultaneous connection or disconnection of corresponding elements belonging to the connection end pair and the measurement end pair possible. Based on an instruction from a photometric control unit of the photometric dispensing control unit, for every one or more pairs of the irradiation end and the light receiving end, connection or disconnection between the irradiation end and the light source may be sequentially performed in conjunction with connection and disconnection between the light receiving end and the photoelectric conversion unit.

A ninth aspect of the invention provides a photometric dispensing apparatus in which each of the one or more sets of photometric dispensing nozzle units further includes a flow path built-in support body in which the nozzle and the dispensing cylinder are independently and detachably attached and supported in parallel, and a partial region of the suction/discharge flow path is formed therein.

Here, the "flow path built-in support body" corresponds to a flow path built-in support member when there is only one set of the nozzle, the dispensing cylinder, and the suction/discharge flow path. The flow path built-in support body is provided in the nozzle head.

A tenth aspect of the present invention provides a photometric dispensing apparatus in which the nozzle has a nozzle lateral hole formed through a side wall thereof, the suction/discharge port is a cylinder lateral hole formed through a side wall of the cylinder, and the partial region of the suction/discharge flow path is a connecting flow path allowing the nozzle lateral hole of the nozzle attached to and supported by the flow path built-in support body to communicate with the cylinder lateral hole of the dispensing cylinder attached to the flow path built-in support body and supported thereby so as to face the nozzle lateral hole.

Here, the dispensing cylinder can be connected to the nozzle with the shortest distance by forming the connecting flow path so as to extend linearly inside the flow path built-in support body.

An eleventh aspect of the invention provides a photometric dispensing apparatus in which the flow path built-in support body includes: a flow path built-in support block; one or more sets of a nozzle attachment longitudinal hole and a cylinder attachment longitudinal hole bored in the flow path built-in support block; and the connecting flow path formed in the flow path built-in support block and allowing the nozzle attachment longitudinal hole to communicate with the cylinder attachment longitudinal hole in each of the sets, the nozzle is closely attached to the nozzle attachment longitudinal hole, the dispensing cylinder is closely attached to the cylinder attachment longitudinal hole, and the connecting flow path allows the nozzle lateral hole of the attached nozzle to communicate with the cylinder lateral hole of the attached dispensing cylinder.

A twelfth aspect of the present invention provides a photometric dispensing apparatus in which the flow path built-in support block of the flow path built-in support body further includes a pressure sensor communicating with the distal end opening of each of the nozzles, the side wall of the nozzle has a second nozzle lateral hole passing through the side wall, the pressure sensor communicates with the distal end opening through the second nozzle lateral hole, the flow path built-in support block further has a pressure sensor attachment hole with which the pressure sensor is independently and detachably attached, and a pressure sensor flow path allowing the attached pressure sensor to communicate with the second nozzle lateral hole is formed.

A thirteenth aspect of the present invention provides a photometric dispensing apparatus in which the cavity of the dispensing cylinder has a large diameter region having a large diameter inner peripheral surface and a small diameter region provided on the suction/discharge port side of the large diameter region and having a small diameter inner peripheral surface, the plunger has a thick shaft portion provided so as to be slidable in the large diameter region and a thin shaft portion protruding from a distal end surface of the thick shaft portion in the axial direction and provided so as to be slidable in the small diameter region, a play region in which the thick shaft portion is configured to move with a play in the axial direction is formed between the large diameter region and the small diameter region, the suction/discharge port is located in a cavity ahead of the small diameter region, the photometric dispensing control unit includes a minute amount/large amount judgement and instruction means that determines, in a case where there is an instruction for suction/discharge of a predetermined amount of liquid to the dispensing tip, whether the predetermined amount is a minute amount or a large amount, and instructs the suction/discharge driving unit to locate the thin shaft portion of the plunger of the dispensing cylinder in a minute amount suction/discharge section in which the thin shaft portion is slidable in the small diameter region and to move the thin shaft portion by a moving distance according to the predetermined amount in a case where the judgement result is a minute amount, and instructs the suction/discharge driving unit to locate the thick shaft portion of the plunger in a large amount suction/discharge section in which the thick shaft portion is slidable in the large diameter region and to move the thick shaft portion by a moving distance according to the predetermined amount in a case where the judgement result is a large amount.

Here, the phrase "judging whether the predetermined amount is a minute amount or a large amount" means, for example, judging the predetermined amount to be a minute amount in a case where the predetermined amount is smaller than a threshold value, and judging the predetermined amount to be a large amount in a case where the predetermined amount is larger than the threshold value, in which the threshold value is a maximum minute amount determined by the length d3 from a distal end surface (or sealing position) of the seal member of the thin shaft portion in the minute amount suction/discharge section to a distal end surface of the thick shaft portion in the axial direction and the cross-sectional area $S2$ of the small diameter region, that is, $d3 \times S2$. Alternatively, the predetermined amount is judged to be a minute amount in a case where the predetermined amount is smaller than a threshold value, and judged to be a large amount in a case where the predetermined amount is larger than the threshold value, in which the threshold value is a value determined by the cross-sectional area $S1$ of the large diameter region in the large amount suction/discharge section and a predetermined distance s from the bottom dead center of the large diameter region, for example, 1 mm, that is, $s \times S1$.

The minute amount/large amount judgement and instruction means includes CPU+program+memory including, for example, CPU, ROM, RAM, various external memories, or a communication function such as LAN, a program stored in ROM, or the like.

The dispensing tip is preferably attached in a state where the dispensing tip can be attached to the nozzle, that is, by storing the dispensing tip in a tip storing unit while an attachment opening formed at an upper end of a thick pipe portion of the dispensing tip is on an upper side and an opening of a thin pipe portion is on a lower side, and lowering the nozzle by the nozzle moving mechanism. Note that the nozzle moving mechanism preferably includes, for example, a nozzle head moving mechanism that relatively moves the nozzle head along a Y-axis and a nozzle Z-axis moving mechanism that moves the nozzle provided in the nozzle head in a Z-axis direction. Note that the term "relative" indicates that a relative relation is satisfied in a relation to another object to be compared. Therefore, a case of "relatively moving" may include a case where one object (for example, a nozzle) moves and the other object (for example, a container group) is stationary, a case where one object is stationary and the other object moves, and a case where both objects move (a case where the objects move at different speeds). The nozzle head moving mechanism and the nozzle Z-axis moving mechanism collectively correspond to the nozzle moving mechanism.

A fourteenth aspect of the present invention provides a photometric dispensing method including: a moving step of relatively moving nozzles of one or more photometric dispensing nozzle units including the nozzles which perform suction/discharge of gas to one or more container groups each including a reaction container and a liquid storing unit or a dispensing tip storing unit through a distal end opening, and to which dispensing tips is attached thereto, a dispensing cylinder including a cylinder having a cavity therein and a plunger that slides in the cavity and having a gas suction/discharge port, and a suction/discharge flow path allowing the suction/discharge port to communicate with the distal end opening through the nozzles by the nozzle moving mechanism; an attachment step of attaching the dispensing tips to the nozzles by the nozzle moving mechanism; a suction/discharge step of simultaneously performing suction/discharge of liquid stored in the container groups to the dispensing tips by the suction/discharge driving unit; a removal step of removing the dispensing tips from the nozzles; and a light measuring step of performing measurement by connecting distal end portions of the nozzles to an opening of the reaction container directly or indirectly by the nozzle moving mechanism, and optically connecting a light measuring device with the reaction container through a light guide path optically connected to a light guide end portion formed in the nozzles through the nozzles without through the light guide end portion or the dispensing cylinder.

A fifteenth aspect of the present invention provides a photometric dispensing method in which each of the one or more sets of photometric dispensing nozzle units includes a flow path built-in support body in which the nozzle and the dispensing cylinder are independently and detachably attached and supported in parallel, and a partial region of the suction/discharge flow path is formed therein, and the method further comprises a nozzle unit attachment step of attaching the nozzles and the dispensing cylinders to the flow path built-in support body.

A sixteenth aspect of the present invention provides a photometric dispensing method, in which the cavity of the dispensing cylinder has a large diameter region having a large diameter inner peripheral surface and a small diameter region provided on the suction/discharge port side of the large diameter region and having a small diameter inner peripheral surface, the plunger has a thick shaft portion provided so as to be slidable in the large diameter region and a thin shaft portion protruding from a distal end surface of the thick shaft portion in the axial direction and provided so as to be slidable in the small diameter region, a play region in which the thick shaft portion moves with a play in the axial direction is formed between the large diameter region and the small diameter region, and the suction/discharge port is located in a cavity ahead of the small diameter region, the photometric dispensing method further includes a judgement step of judging whether a predetermined amount is a minute amount or a large amount when suction/discharge of the predetermined amount of liquid is instructed to the dispensing tip, in the attachment step, a minute amount dispensing tip or a large amount dispensing tip is attached based on the judgement result, and the suction/discharge step includes: a minute amount suction/discharge step of causing the dispensing tips to perform suction/discharge of the minute amount of liquid by locating the thin shaft portion of the plunger of the dispensing cylinder in a minute amount suction/discharge section in which the thin shaft portion is slidable in the small diameter region and sliding the thin shaft portion by a distance according to the predetermined amount in a case where the predetermined amount is judged to be a minute amount; and a large amount suction/discharge step of causing the dispensing tips to perform suction/discharge of the large amount of liquid by locating the thick shaft portion of the plunger in a large amount suction/discharge section in which the thick shaft portion is slidable in the large diameter region and sliding the thick shaft portion by a distance according to the predetermined amount in a case where the predetermined amount is judged to be a large amount.

Advantageous Effects of Invention

According to the first, eighth, or fourteenth aspect of the invention, by providing the photometric dispensing nozzle unit, the dispensing treatment and the photometric treatment can be performed using parts and mechanisms common to the treatments, such as the nozzle, the nozzle moving mechanism, or the photometric dispensing control unit. Therefore, it is possible to prevent an increase in apparatus scale, to simplify the structure, to reduce the number of parts, and to perform a highly efficient treatment. In addition, the light guide path is optically connected to the light guide end portion through the nozzle without through the dispensing cylinder. Therefore, it is possible to reduce a structural influence of the light guide end portion and the light guide path connected thereto on suction/discharge operation of the dispensing cylinder and a structural influence of the dispensing cylinder on the light guide path. Therefore, it is easy to change or improve the structure of the dispensing cylinder.

According to the second, ninth, or fifteenth aspect of the invention, the dispensing cylinder and the nozzle are independently and detachably attached to the flow path built-in support member or the flow path built-in support body and supported thereby in parallel. Therefore, a combination of various nozzles corresponding to measurement contents such as measurement of chemiluminescence and measurement of fluorescence, and the appropriate dispensing cylinder matching the volume to be treated can be attached easily by exchanging the nozzles and the dispensing cylinders independently, and a highly versatile treatment can be performed.

The dispensing cylinder is provided in parallel with the nozzle. Therefore, the position of the plunger of the dispensing cylinder does not include the height of the nozzle. Therefore, it is possible to suppress the height of the plunger driving unit and an apparatus scale.

By making a part of the flow path built in the flow path built-in support member (body) and attaching the nozzle and the dispensing cylinder to the flow path built-in support member (body), it is possible to allow the nozzle and the dispensing cylinder to communicate with each other simultaneously. Therefore, handling is easy, and it is possible to firmly connect the nozzle and the dispensing cylinder to each other including the flow path.

According to the third or tenth aspect of the invention, the nozzle lateral hole is formed in a side wall of the nozzle, the cylinder lateral hole is formed in a side wall of the dispensing cylinder, and the nozzle lateral hole and the cylinder lateral hole are formed in the flow path built-in support member (body) and communicate with each other through the connecting flow path. Therefore, the nozzle can be linearly connected to the dispensing cylinder with the shortest distance. Therefore, a dead volume in the flow path can be reduced, and a rapid treatment with high responsiveness and high accuracy can be performed. In particular, suction/discharge of a minute amount of liquid can be reliably performed.

In addition, the dispensing cylinder can be provided in parallel with the nozzle such that the positions of the cylinder lateral hole formed through the side wall of the dispensing cylinder and the nozzle lateral hole formed in the nozzle are aligned horizontally and approach each other, and the cylinder lateral hole and the nozzle lateral hole can communicate with each other through the connecting flow path. Therefore, the dispensing cylinder can communicate with the nozzle with the shortest distance. Therefore, a dead volume in the flow path can be further reduced, and a suction/discharge treatment with high responsiveness can be performed. In particular, suction/discharge of a minute amount of liquid can be reliably performed.

According to the fourth or eleventh aspect of the invention, a lateral hole is formed in each of the nozzle and the dispensing cylinder, an attachment longitudinal hole to which each of the nozzle and the dispensing cylinder is closely attached is formed in the flow path built-in support member or the flow path built-in support body, and each of the nozzle and the dispensing cylinder is attached to the attachment longitudinal hole. As a result, the nozzle and the dispensing cylinder can easily communicate with each other through the connecting flow path formed in the flow path built-in support member can be attached. Therefore, dispensing and photometric treatments can be performed easily and reliably, and a highly reliable photometric dispensing treatment can be performed without imposing a burden on a user.

According to the fifth aspect of the invention, by providing the seal member so as to sandwich a lateral hole with the attachment longitudinal hole, the dispensing cylinder, or the nozzle, airtightness of connection among the nozzle, the dispensing cylinder, and the suction/discharge flow path can be reliably maintained. Therefore, a treatment with high accuracy and high efficiency can be performed.

According to the sixth or twelfth aspect of the invention, a pressure sensor is further provided detachably in each set of the nozzle and the dispensing cylinder through the flow path formed in the flow path support member (body) independently of the nozzle and the dispensing cylinder. Therefore, the pressure sensor can be easily attached, and can be used according to a purpose of a treatment thereof, resulting in high reactivity.

According to the seventh, thirteenth, or sixteenth aspect of the invention, a minute amount of liquid and a large amount of liquid are divided in advance, a small diameter region and a large diameter region of the plunger and a thin shaft portion and a thick shaft portion of the cylinder, having an inner diameter and an outer diameter suitable for each of the divisions, are provided, and in a case where there is a dispensing instruction, determination is made to determine any one of the divisions, and a more suitable driving position of the plunger in the axial direction is instructed. As a result, suitable dispensing can be performed in each case of a minute amount and a large amount, and a highly versatile dispensing treatment with high accuracy can be performed.

Using one dispensing cylinder, suction/discharge of a minute amount of liquid can be performed to the dispensing tip only by moving the plunger in the axial direction, and suction/discharge of a large amount of liquid can also be performed. Therefore, it is not necessary to prepare a plurality of types of dispensing cylinders corresponding to the amount of liquid to perform exchange or replacement, and a dispensing treatment can be performed rapidly and easily.

By providing a thick shaft portion and a thin shaft portion having different outer diameters in the same plunger and providing a large diameter region and a small diameter region having different inner diameters in the same cylinder, it is not necessary to dispose a plurality of types of cylinders, and manufacturing can be performed inexpensively and compactly.

BRIEF DESCRIPTION OF DRAWINGS

FIG. 14 is a table illustrating examples of results of a distilled water dispensing experiment of the photometric dispensing apparatus according to the first embodiment of the present invention.

FIG. 15 is a table illustrating examples of results of an experiment of the photometric dispensing apparatus according to the first embodiment of the present invention for a predetermined fluorescent solution.

FIG. 16 illustrates a table and a graph illustrating examples of results of an experiment of the photometric dispensing apparatus according to the first embodiment of the present invention for a fluorescent solution having a predetermined concentration.

DESCRIPTION OF EMBODIMENTS

Figure 1:
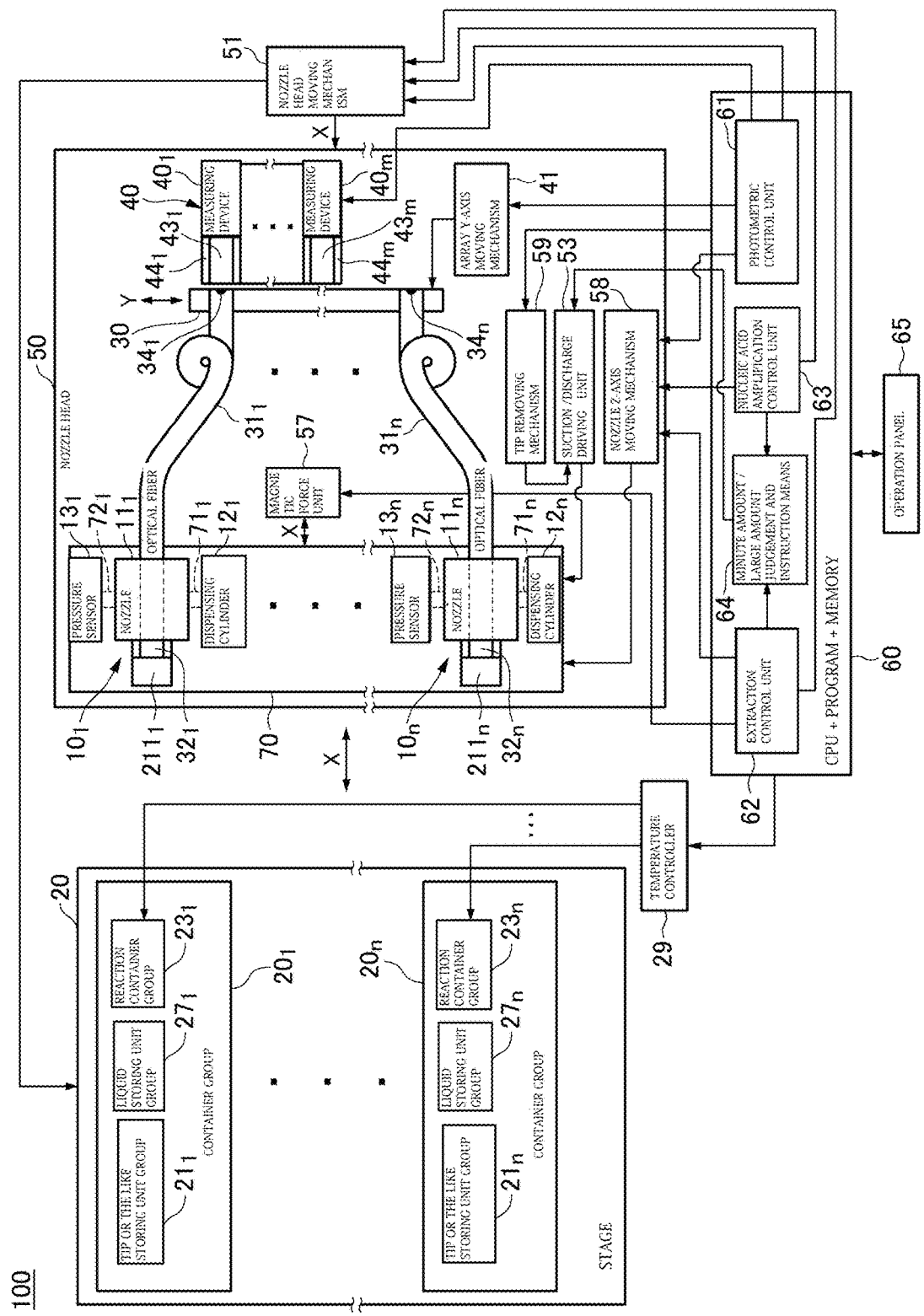
FIG. 1 is a block diagram of a photometric dispensing apparatus according to a first embodiment of the present invention.

Subsequently, embodiments of the present invention will be described with reference to the drawings. Note that the embodiments should not be construed as limiting the present invention unless otherwise specified. In the embodiments or embodiment examples, the same reference numeral is used to denote the same part, and description thereof is omitted.

FIG. 1 illustrates a block diagram of a photometric dispensing apparatus 100 according to a first embodiment of the present invention using a photometric dispensing nozzle unit according to the first embodiment.

The photometric dispensing apparatus 100 roughly includes: a stage 20 in which a plurality of (n in this example, n≥1, corresponding to lanes in FIGS. 15 and 16) container groups $20_i$ (i=1, . . . n) is arranged; a nozzle head 50 including n sets of photometric dispensing nozzle units $10_1$ to $10_n$ each at least including nozzles $11_1$ to $11_n$ to which large amount dispensing tips $211_1$ to $211_n$ or minute amount dispensing tips $212_1$ to $212_n$ can be attached and which can receive or irradiate light at distal ends thereof and dispensing cylinders $12_1$ to $12_n$ which communicate with the nozzles $11_1$ to $11_n$ and perform suction/discharge of gas to the dispensing tips; a nozzle head moving mechanism 51 that can move the nozzle head 50 relatively to the container groups 20, for example, in an X-axis direction; a CPU+program+memory 60 including, for example, a CPU that performs various controls, a ROM, a RAM, various external memories, a communication function such as LAN, and a program stored in the ROM or the like as the photometric dispensing control unit; and an operation panel 65 including a display unit such as a liquid crystal display and an operation unit such as operation keys or a touch panel.

The nozzles $11_1$ to $11_n$ provided in the respective sets of photometric dispensing nozzle units $10_1$ to $10_n$ include light guide end portions $32_1$ to $32_n$ capable of receiving or irradiating light at distal ends of the nozzles $11_1$ to $11_n$, and light guide paths $31_1$ to $31_n$ passing through the nozzles $11_1$ to $11_n$ and optically connected to the light guide end portions $32_1$ to $32_n$, and the dispensing cylinder $12_1$ to $12_n$ include cylinders each having a cavity therein, plungers provided so as to be slidable in the cavity, and a suction/discharge port bored in each of the cylinders, and further include a suction/discharge flow path passing through the nozzles $11_1$ to $11_n$ and allowing the suction/discharge port to communicate with distal end openings of the nozzles $11_1$ to $11_n$.

The nozzle head 50 further includes: a flow path built-in support body 70 in which the one or more sets of nozzles $11_1$ to $11_n$ and the dispensing cylinders $12_1$ to $12_n$ are independently and detachably attached and supported in parallel, and connecting flow paths $71_1$ to $71_n$ are formed therein as a partial region of the suction/discharge flow path; a suction/discharge driving unit 53 that moves the plunger of the dispensing cylinders $12_1$ to $12_n$ in the vertical direction and makes simultaneous suction/discharge of liquid by the dispensing tips $211_1$ to $211_n$ and $212_1$ to $212_n$ attached to the nozzles $11_1$ to $11_n$ to the container groups $20_1$ to $20_n$ possible; a tip removing mechanism 59 that can remove the dispensing tips $211_1$ to $211_n$ and $212_1$ to $212_n$ attached to the nozzles $11_1$ to $11_n$ using the suction/discharge driving unit 53; a nozzle Z-axis moving mechanism 58 that can move the nozzles $11_1$ to $11_n$ in the Z-axis direction; and a magnetic force unit 57 that can apply a magnetic field to the inside of the dispensing tips $211_1$ to $211_n$ and $212_1$ to $212_n$ in which magnets are attached to the nozzles by providing the magnets so as to be movable forward and backward with respect to the dispensing tips $211_1$ to $211_n$ and $212_1$ to $212_n$.

The nozzle head 50 further includes a light measuring device 40.

The light measuring device 40 includes: a connection end array 30 that arranges and supports a plurality of (n in this example) connection ends $34_1$ to $34_n$ provided so as to correspond to the light guide end portions $32_1$ to $32_n$, having distal ends thereof at the light guide end portions $32_1$ to $32_n$, and having rear ends of optical fibers (bundles) as light guide portions $31_1$ to $31_n$ along a predetermined path (a linear path in the Y-axis direction in this example) formed on a horizontal surface as an array surface so as to be integrated at an interval narrower than an interval between the light guide end portions $32_1$ to $32_n$; and for example, m types (six types in this example) of specific wavelength measuring devices $40_j$ (j=1, . . . m, omitted below) that can receive fluorescence having m specific wavelengths or light within m specific wavelength bands, and can irradiate excitation light having m specific wavelengths or excitation light within m specific wavelength bands, irradiated for emission of the light. Note that in a case where the optical fibers ($31_1$ to $31_n$) include an irradiation optical fiber (bundle) 35 and a light receiving optical fiber (bundle) 36, the connection ends $34_1$ to $34_n$ as rear ends of the optical fibers ($31_1$ to $31_n$) include first connection ends (for irradiation) and second connection end (for light reception), and arranged and supported along a linear path in the Y-axis direction. In this case, each of the light guide end portions $32_1$ to $32_n$ corresponds to a pair of the light irradiating end and the light receiving end.

Each specific wavelength measuring device $40_j$ has a measurement end $44_j$ provided in proximity (non-contact) or in contact with the array surface, and sequentially connectable to the connection end $34_1$ along the predetermined path (linear path along the Y-axis direction). Each measurement end $44_j$ has two measurement ends of a first measurement end $42_j$ and a second measurement end $43_j$ arranged in the Y-axis direction in a case where light emission is fluorescence. These measurement ends are arranged, for example, on a measurement end array surface. The first measurement end $42_j$ is optically connected to an irradiation source provided in each specific wavelength measuring device $40_j$. The second measurement end $43_j$ is optically connected to a photoelectric conversion unit such as a photomultiplier provided in the specific wavelength measuring device $40_j$. In a case where light emission is chemiluminescence or the like, it is only required to provide at least the second measurement end $43_j$. In this case, the first connection ends of the rear ends of the irradiation optical fibers (bundle) 35 are arranged on the connection end array surface of the connection end array 30 so as to be connectable to the first measurement end $42_j$. The second connection ends of the rear ends of the light receiving optical fibers (bundle) 36 are arranged on the connection end array surface of the connection end array 30 so as to be connectable to the second measurement end $43_j$.

Furthermore, the nozzle head 50 includes an array Y-axis moving mechanism 41 as an array moving mechanism that moves the connection end array 30 on the nozzle head 50 in the Y-axis direction by bringing the connection end array surface and the measurement end array surface in proximity (non-contact) or sliding the connection end array surface and the measurement end array surface so as to sequentially connect the connection ends $34_1$ arranged on the connection end array surface of the connection end array 30 to the measurement ends $44_j$ arranged on the measurement end array surface.

The stage 20 include a plurality of (eight in this example) container groups $20_1$ corresponding to the respective nozzles that one nozzle enters and the other nozzles do not enter. Each of the container groups $20_1$ includes: a liquid storing unit group $27_1$ including a plurality of storing units storing or capable of storing a reagent solution or the like; a tip or the like storing unit group $21_1$ including a sealing lid storing unit that stores the one or more light transmitting sealing lids $25_1$ detachably attached to the nozzles, and storing a plurality of large amount dispensing tips $211_1$, and minute amount dispensing tips $212_1$ detachably attached to the nozzles, and a piercing tip; and reaction containers $23_1$ to $23_n$ capable of controlling temperature of a PCR tube or the like. The liquid storing unit group $27_1$ includes one or more liquid storing units that store at least a magnetic particle suspension, and two or more liquid storing units that store a separation/extraction solution used for separation and extraction of a nucleic acid or fragments thereof. Furthermore, the liquid storing unit group $27_1$ stores an amplification solution used for amplification of a nucleic acid and a sealing solution for sealing the amplification solution stored in the PCR tube $231_1$ as the reaction container in the PCR tube $231_1$.

Figure 2:
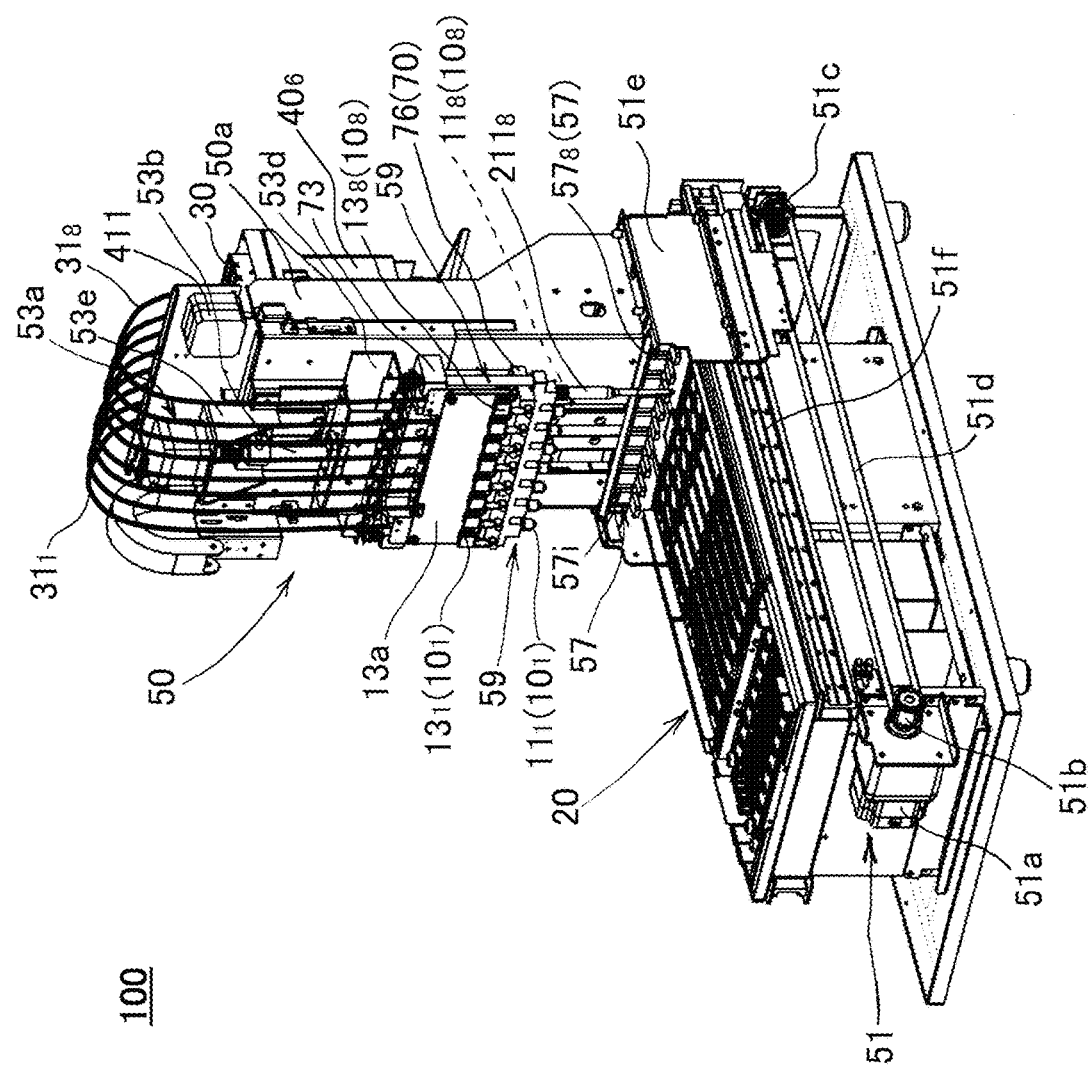
FIG. 2 is a perspective view of the photometric dispensing apparatus according to the first embodiment of the present invention.
Figure 3:
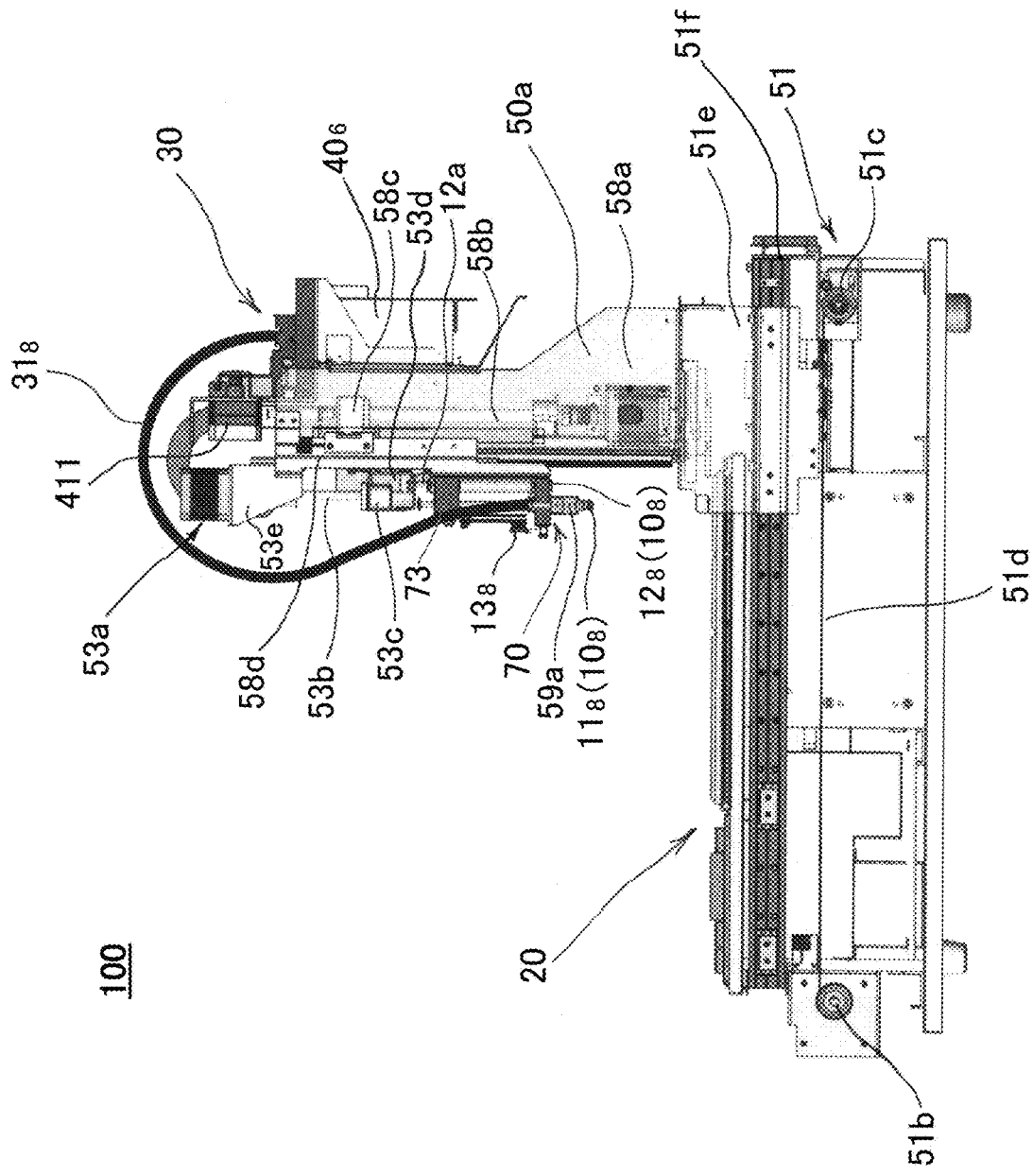
FIG. 3 is a partially transparent side view of the apparatus illustrated in FIG. 2.
Figure 4:
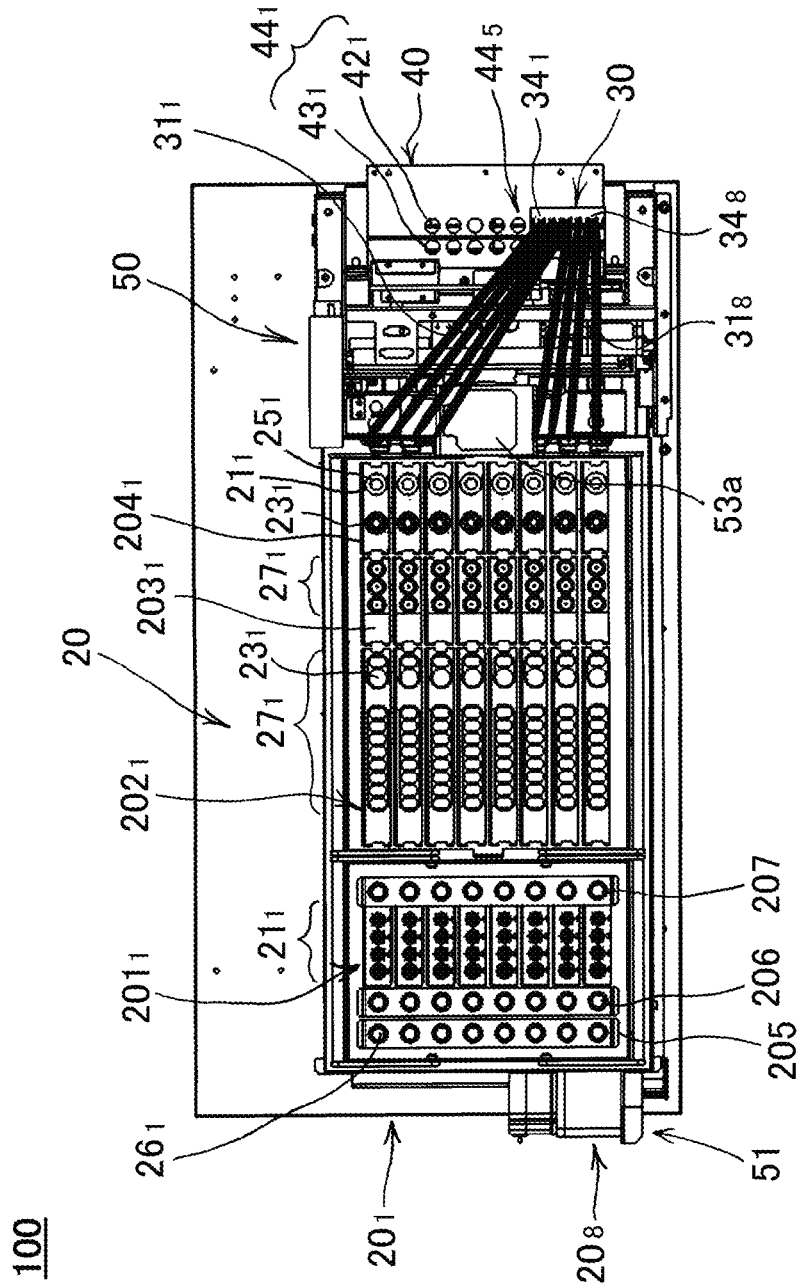
FIG. 4 is a plan view of the apparatus illustrated in FIG. 2.

FIGS. 2 to 4 illustrate a perspective view, a side view, and a plan view in which the photometric dispensing apparatus 100 illustrated in FIG. 1 is further embodied (in a case of n=8 and m=6), respectively On the stage 20, four cartridge containers $201_1$ to $204_1$ are loaded in a vertical row for each of the container groups $20_1$ to $20_n$ arranged in n rows (eight rows in this example), and cartridge containers 205 to 207 that store three samples are loaded in parallel in a lateral direction.

As illustrated in FIG. 2, the nozzle head moving mechanism 51 includes: a drive motor 51a attached to a pedestal on which the stage 20 is placed; a pulley 51b rotationally driven by the drive motor and a pulley 51c to make a pair with the pulley 51b; a timing belt 51d that is stretched by the two pulleys 51b and 51c and can travel in the X-axis direction; and a leg 51e attached to the timing belt 51d and supporting a frame 50a of the nozzle head 50. The leg 51e is movably supported in the X-axis direction, for example, by a linear motion guiding device 51f, and a lower side of the leg 51e is connected to the timing belt 51d.

The nozzle head 50 includes the photometric dispensing nozzle units $10_1$ to $10_n$ including the nozzles $11_1$ to $11_n$ (n=8 in this example) and dispensing cylinders $12_1$ to $12_n$ (n=8 in this example) independently and detachably attached to the flow path built-in support block 76 of the flow path built-in support body 70 and supported thereby in parallel, respectively, and upper sides of the dispensing cylinders $12_1$ to $12_n$ are attached to a cylinder attachment body 73 of the flow path built-in support body 70. Pressure sensors $13_1$ to $13_n$ (n=8 in this example) are provided in the photometric dispensing nozzle units $10_1$ to $10_n$ (n=8 in this example), respectively. The pressure sensors $13_1$ to $13_n$ are connected to a pressure sensor substrate 13a.

In the nozzle head 50, the suction/discharge driving unit 53 includes: a suction motor 53a attached to a mount 53e; a ball screw 53b rotationally driven by the motor 53a; a nut portion 53c screwed with the ball screw 53b and movable in the vertical direction; and a suction/discharge driving member 53d that is connected to the nut portion 53c and can raise the plunger 12a of the dispensing cylinders $12_1$ to $12_n$. The suction/discharge driving member 53d has a hole or a gap having a size that is engageable with a flange 12t but does not come in contact with the plunger 12a. In the nozzle head 50, n (eight in this example) magnetic poles of permanent magnets are arranged as the magnetic force unit 57 in a row in the Y-axis direction.

As illustrated in FIG. 3, in the nozzle head 50, the nozzle Z-axis moving mechanism 58 includes a Z-axis drive motor 58a placed on the frame 50a, a ball screw 58b rotationally driven by the Z-axis drive motor 58a, a nut portion 58c screwed with the ball screw 58b, and a wall-shaped Z-axis moving body 58d connected to the nut portion 58c.

To the Z-axis moving body 58d, the suction motor 53a, the motor mount 53e, the cylinder attachment body 73 that attaches the dispensing cylinders $12_1$ to $12_8$ on upper sides thereof, and the n sets (eight sets in this example) of the nozzles $11_1$ to $11_n$ (n=8 in this example) and the dispensing cylinders $12_1$ to $12_n$ are independently and detachably attached and supported in parallel, and the flow path built-in support block 76 of the flow path built-in support body 70 having the connecting flow paths $71_1$ to $71_n$ (n=8 in this example) as a partial region of the suction/discharge flow path therein is attached.

As illustrated in FIG. 4, the cartridge container $201_i$ (i=1, . . . 8) includes the tip or the like storing unit $21_i$ that stores four tips, for example, a piercing tip, one large amount dispensing tip $211_i$, and two minute amount dispensing tips. The cartridge container $202_i$ includes eight liquid storing units $27_i$ that store an extraction reagent or the like, a reaction container $23_i$ that can be set to a constant temperature condition, and a liquid storing unit that can be set to a constant temperature condition and stores a product. The cartridge container $203_i$ includes three liquid storing units $27_i$ storing an amplification reagent. The cartridge container $204_i$ includes a sealing lid storing unit as the tip or the like storing unit $21_i$ that stores the PCR tube ($23_i$) and the sealing lid 25. Each of the cartridge containers 205 and 206 includes a sample tube $26_i$ that stores a sample, and the cartridge container 207 stores residual liquid.

In the nozzle head 50, the measuring device 40 is attached to the nozzle head frame 50a such that the m types (six types in this example) of specific wavelength measuring devices $40_1$ to $40_m$ (m=8 in this example) are arranged in the Y-axis direction with the measurement ends $44_1$ to $44_m$ (m=6 in this example, and one is hidden in the connection end array 30) on an upper side. The connection end array 30 in which the connection ends $34_1$ to $34_n$ (n=8 in this example) are arranged in the Y-axis direction is provided so as to be movable in the Y-axis direction on an upper side of the specific wavelength measuring devices $40_1$ to $40_m$. As described above, each of the connection ends $34_1$ to $34_n$ includes a first connection end as a rear end of the irradiation optical fiber 35 and a second connection end as a rear end of the light receiving optical fiber 36. Each of the measurement ends $44_1$ to $44_m$ includes a first measurement end $42_i$ and a second measurement end $43_i$. The first measurement ends $42_i$ are optically connected to an irradiation source of the excitation light, and can be sequentially connected to the first connection ends. The second measurement ends $43_i$ are optically connected to the photoelectric conversion unit and arranged in a row in the Y-axis direction so as to be sequentially connectable to the second connection ends.

Figure 5:
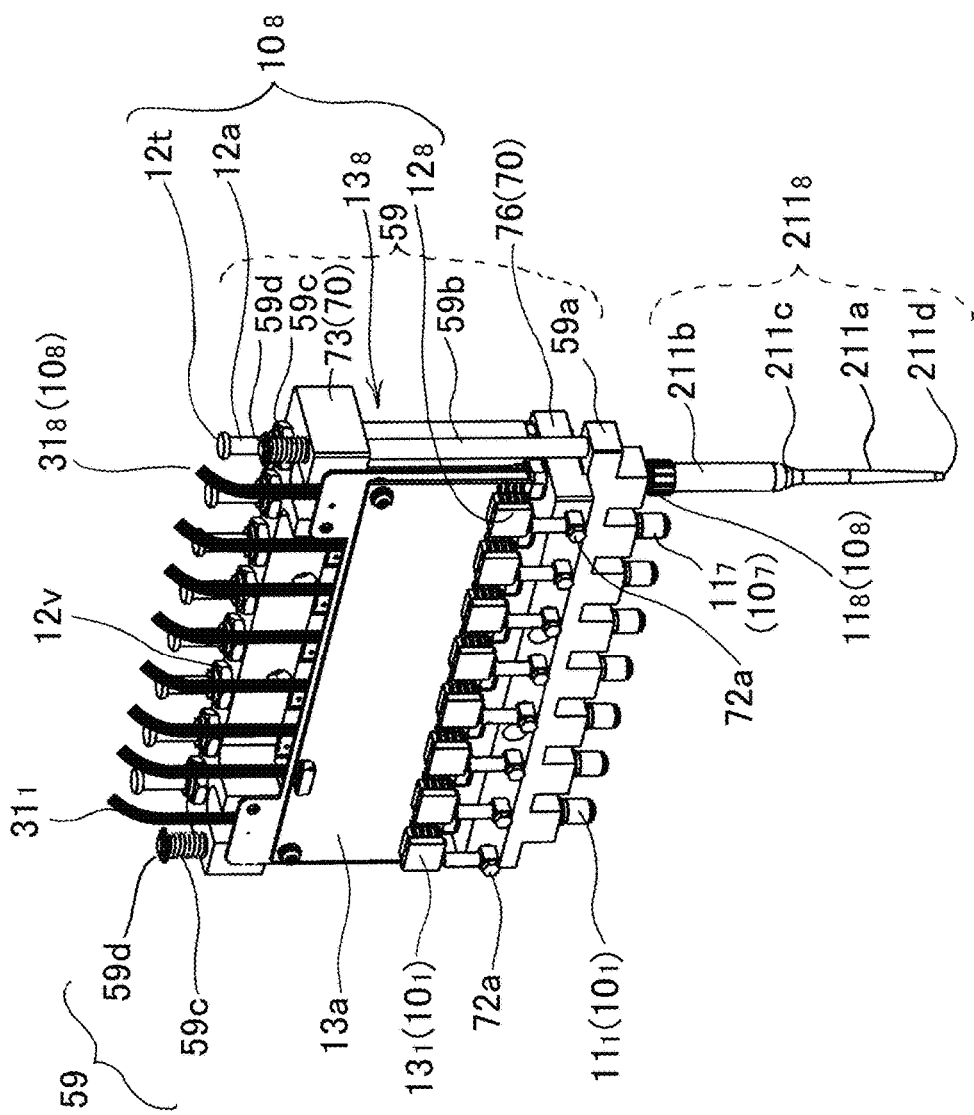
FIG. 5 is a partially enlarged perspective view illustrating a main part of a nozzle head in FIGS. 2 and 3.

FIG. 5 is a main part of the nozzle head 50 of the photometric dispensing apparatus 100 illustrated in FIGS. 2 and 3, and illustrates the cylinder attachment body 73 and the flow path built-in support block 76 of the flow path built-in support body 70 attached to the Z-axis moving body 58d, n sets (n=8) of the nozzles $11_1$ to $11_n$ attached thereto, the dispensing cylinders $12_1$ to $12_n$, the pressure sensors $13_1$ to $13_n$, and the tip removing mechanism 59.

Eight dispensing cylinders $12_1$ to $12_n$ (n=8) are attached to the cylinder attachment body 73 with the plunger 12a on an upper side, and are supported such that lower end portions thereof are in close contact with cylinder attachment longitudinal holes $75_1$ to $75_n$ (n=8) of the flow path built-in support body 70. These dispensing cylinders $12_1$ to $12_n$ are screwed with the cylinder attachment body 73 by a ring-shaped screw 12v.

The flow path built-in support body 70 communicates with the nozzles $11_1$ to $11_n$ through a conduit 72a communicating with a flow path having the n pressure sensors $13_1$ to $13_n$ therein. The pressure sensors $13_1$ to $13_n$ are connected to the pressure sensor substrate 13a attached to the cylinder attachment body 73.

As illustrated in FIG. 5, the tip removing mechanism 59 includes: two injection pins 59b and 59b that can move downward by being pressed due to further lowering of the suction/discharge driving member 53d of the suction/discharge driving unit 53 beyond the suction/discharge section; and a tip removing member 59a connected to lower ends of the injection pins 59b, provided below the flow path built-in support block 76, and having holes formed so as to surround the nozzles $11_1$ to $11_n$ and to be movable in the axial direction, and having inner diameters larger than the nozzles $11_1$ to $11_n$ but smaller than the largest outer diameter of the dispensing tips $211_1$ to $211_n$ and $212_1$ to $212_n$.

Furthermore, the tip removing mechanism 59 includes: a head 59d provided at an upper end of the inject pin 59b and pressed by the suction/discharge driving member 53d; and a spring 59c formed so as to surround the inject pin 59b and biasing the head 59d upward such that one end thereof is attached to the cylinder attachment body 73, and the other end thereof reaches the head 59d.

Figure 6:
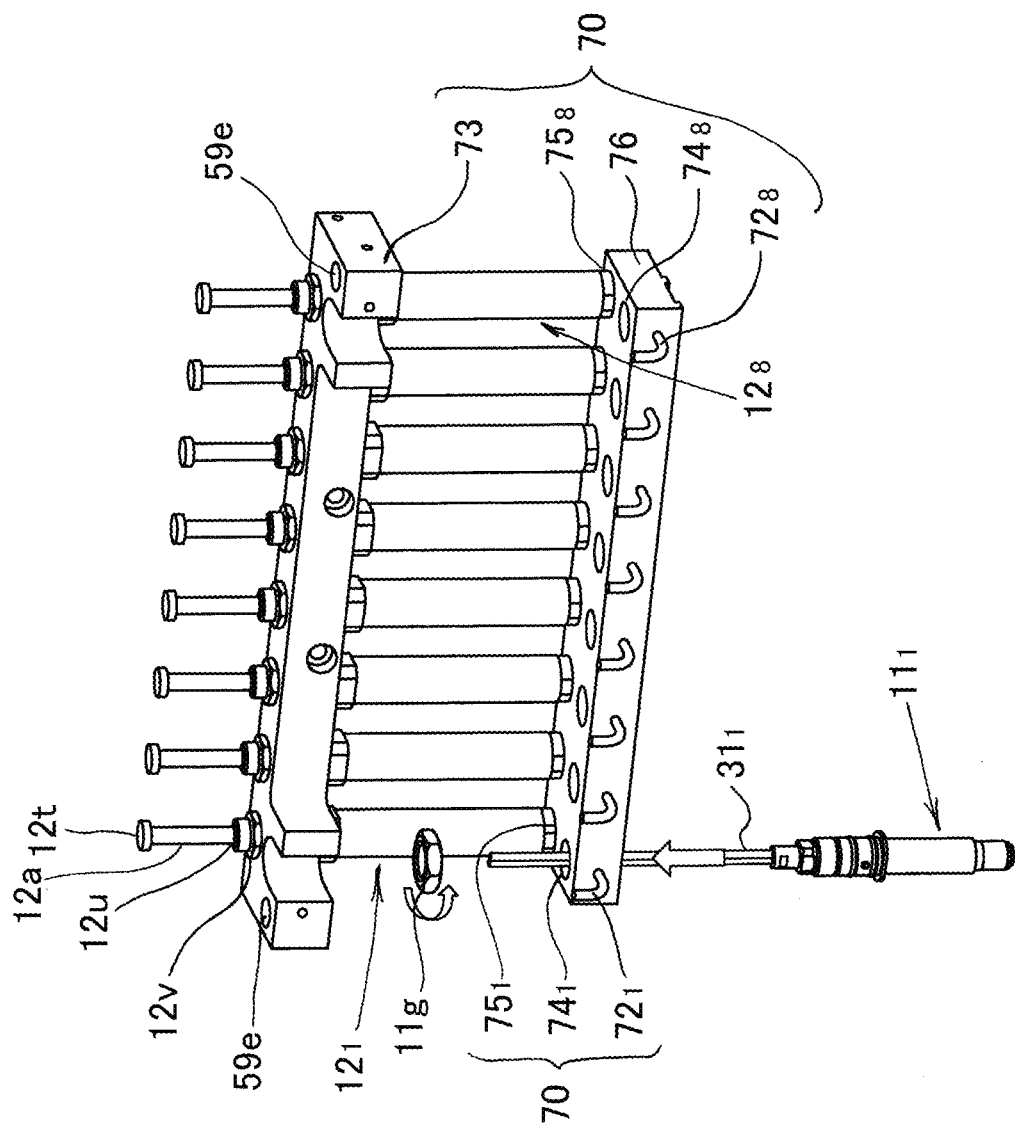
FIG. 6 is a perspective view excluding some components in FIG. 5.

FIG. 6 clearly illustrates the flow path built-in support body 70 including the cylinder attachment body 73 illustrated in FIG. 5. In the cylinder attachment body 73, n (n=8 in this example) longitudinal holes are arranged in a row in a longitudinal direction, the eight dispensing cylinders $12_1$ to $12_n$ (n=8) are inserted from upper sides thereof into the longitudinal holes with the plunger 12a facing upward, and a lower end portion is supported so as to be closely fitted to the cylinder attachment longitudinal holes $75_1$ to $75_n$ (n=8) of the flow path built-in support body 70. These dispensing cylinders $12_1$ to $12_n$ are attached to the cylinder attachment body 73 by the ring-shaped screw 12v. The cylinder attachment body 73 has, in addition to n (n=8) longitudinal holes arranged in a row and attaching the dispensing cylinders $12_1$ to $12_n$, two longitudinal holes 59e at both ends located outside the row and protruding in the X-axis direction by a predetermined distance. The inject pin 59b passes through the longitudinal hole 59e.

As illustrated in FIG. 6, in the flow path built-in support body 70, n (n=8 in this example) nozzle attachment longitudinal holes $74_1$ to $74_n$ (n=8) are arranged in a row such that the nozzles $11_1$ to $11_n$ can be inserted from lower sides thereof and can be screwed with a ring-shaped screw 11g to be attached, and pressure sensor flow paths $72_1$ to $72_n$ are further formed.

Figure 7:
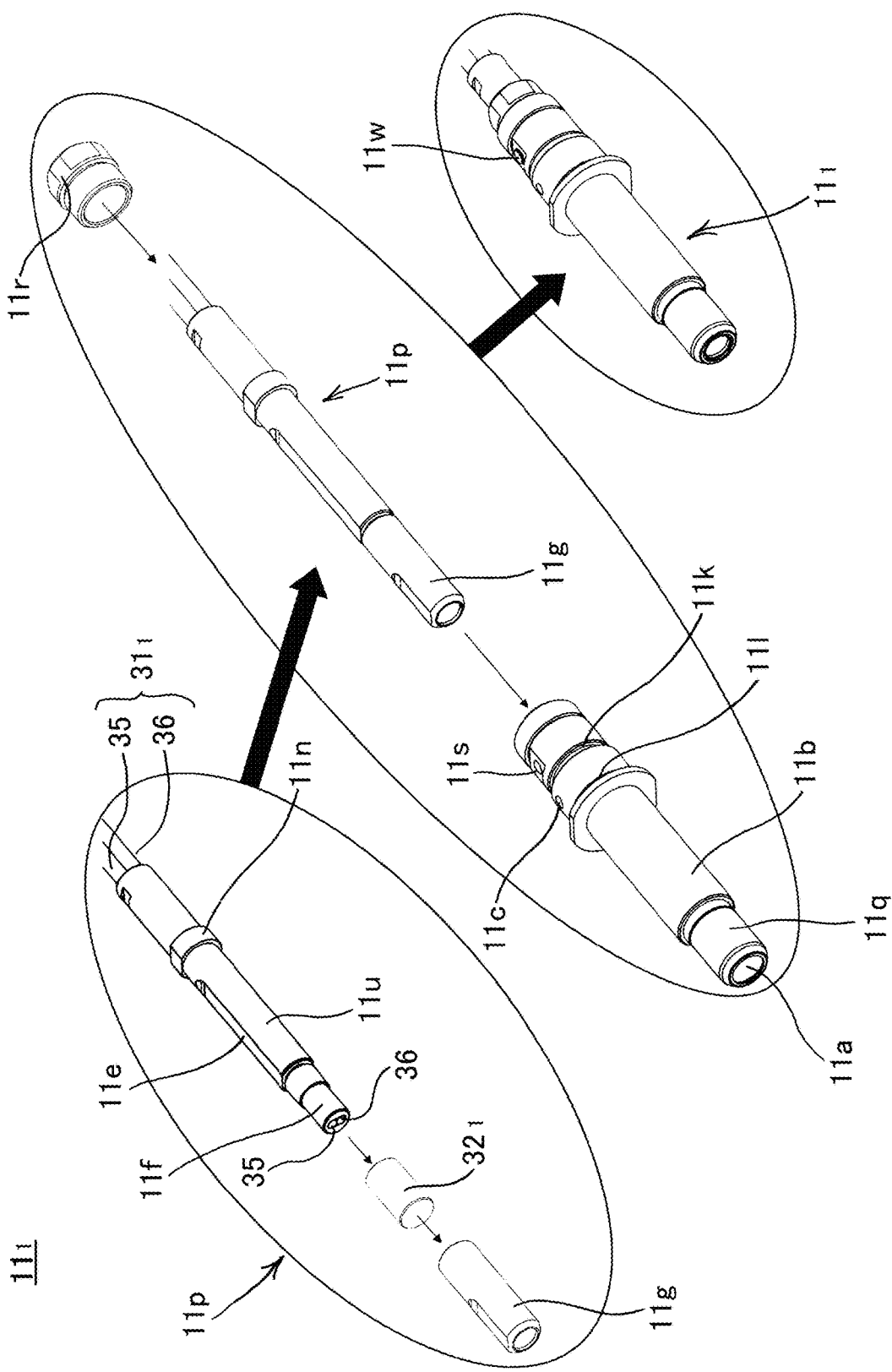
FIG. 7 is a view illustrating tip removing operation based on the partially enlarged side view of FIG. 3.

FIG. 7 illustrates the structure of each of the nozzles $11_1$ to $11_8$ included in the photometric dispensing nozzle units $10_1$ to $10_n$.

The nozzle $11_i$ (i=1 in this example) includes: a substantially tubular nozzle main body 11b having a distal end opening 11a at a distal end thereof; the optical system unit 11p inserted into the nozzle main body 11b; and a ring screw 11r used for attaching the nozzle 11 to the flow path built-in support body 70 by screwing.

A distal end portion 11q of the nozzle 11 can be attached to the attachment openings of the dispensing tips 211 and 212 by fitting, has a nozzle lateral hole 11c passing through a side wall with a close contact surface, and has O-rings 11k and 111 provided so as to sandwich the nozzle lateral hole 11c in the vertical direction and so as to surround the axis along an outer periphery thereof.

The optical system unit 11p includes: a rod lens as the light guide end portion $32_i$ provided at a distal end thereof; the light guide path 31 including the irradiation optical fiber 35 and the light receiving optical fiber 36 optically connected to the rod lens ($32_i$) at an end surface thereof; a ferrule unit 11u as the light guide path end solid member through which the light guide path 31 passes and which is inserted and fitted into the nozzle main body 11b; a lens holding tube 11g fitted and attached to a holding tube fitting portion 11f of the ferrule unit 11u and holding the lens ($32_i$) therein; and a cut-out surface 11e formed so as to cut out an outer peripheral surface of the cylindrical ferrule unit 11u in the axial direction. Note that one end of the irradiation optical fiber 35 and one end of the light receiving optical fiber 36 are optically connected to the rod lens ($32_i$). The other end of the irradiation optical fiber 35 and the other end of the light receiving optical fiber 36 are arranged in a row in the Y-axis direction in the connection end array 30 as a first connection end and a second connection end so as to be optically connectable to the second measurement end $43_j$ and the first measurement end $42_j$, respectively (see FIGS. 4 and 10).

A flange 11v is provided on an outer peripheral surface of the ferrule unit 11u. The ferrule unit 11u is fixed to the nozzle main body 11b such that the ferrule unit 11u does not move in the nozzle $11_i$ by a screw 11w screwed with a screw hole 11s bored in the nozzle main body 11b.

Figure 8:
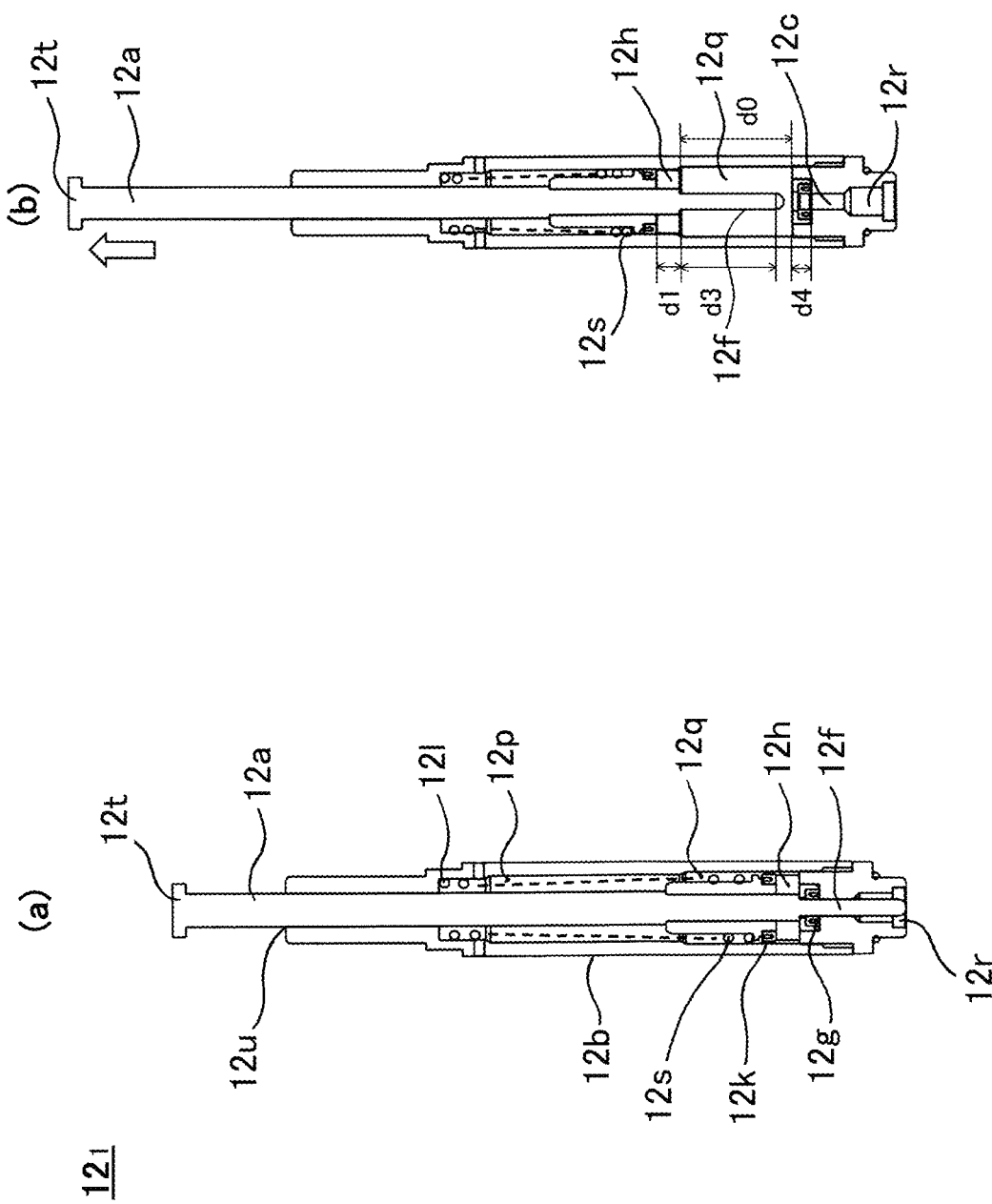
FIG. 8 is an exploded perspective view of a nozzle of a photometric dispensing nozzle unit according to the first embodiment of the present invention.

FIG. 8 illustrates a cross section of the dispensing cylinder 12 in a case where a lower end portion 12d described later is removed.

The dispensing cylinder 12 includes: a cylinder 12b having a cavity (12c, 12r, 12q, 12p) therein; a lower end portion 12d (see FIG. 10) located at a lower end of the cylinder 12b, having a cylinder lateral hole 12e as a gas suction/discharge port, and attaching the dispensing cylinder $12_8$ to the flow path built-in support block 76 by being inserted into the cylinder attachment longitudinal hole $75_8$ from a lower side of the flow path built-in support block 76 and screwing with the cylinder 12b inserted from an upper side of the cylinder attachment longitudinal hole $75_8$; and a plunger 12a provided so as to be slidable in the cavity (12c, 12r, 12q, and 12p) in the axial direction, located outside the cylinder 12b, and having a flange 12t engaged with the suction/discharge driving member 53d (see FIG. 9) driven by a stepping motor or the like.

The cavity (12c, 12r, 12q, 12p) formed in the cylinder 12b has a large diameter region 12p having a large diameter inner peripheral surface, and a small diameter region $12c$ formed on the gas suction/discharge port side of the large diameter region and having a small diameter inner peripheral surface. Between the large diameter region $12p$ and the small diameter region $12c$, there is a play region $12q$ which has a maximum inner diameter larger than the large diameter and in which the thick shaft portion $12h$ does not slide. These regions are formed coaxially. The cavity $12r$ is a portion to which the lower end portion $12d$ is inserted and attached (see FIG. 10).

The plunger $12a$ includes: the thick shaft portion $12h$ provided coaxially with the cavity ($12c$, $12r$, $12q$, $12p$) of the cylinder $12b$ formed in the axial direction of the cavity ($12c$, $12r$, $12q$, $12p$) so as to be slidable in the large diameter region $12p$ through an opening $12u$ formed at the other end of the cylinder $12b$; and a thin shaft portion $12f$ protruding from a distal end surface of the thick shaft portion $12h$ in the axial direction and provided so as to be slidable in the small diameter region $12c$.

Furthermore, in the dispensing cylinder $12_8$ according to the present embodiment, a seal member $12g$ (packing or the like) is provided in a peripheral direction on an inner peripheral surface of an upper end portion of the small diameter region $12c$, and a seal member $12k$ is provided in a peripheral direction on an outer peripheral surface of the thick shaft portion $12h$. The dispensing cylinder 12 includes a coiled spring $12s$ having one end attached to an annular groove 121 bored in an upper end surface of the large diameter region $12p$, and having the other end wound around the plunger $12a$ so as to stretch the thick shaft portion $12h$. The thick shaft portion $12h$ is pressed against a step at a boundary between the small diameter region $12c$ which is a bottom dead center and the play region $12q$ (FIG. 8($a$)). The step protrudes in an inward direction toward the lower direction. FIG. 8($b$) illustrates a state in which the plunger $12a$ is raised, the thin shaft portion $12f$ is withdrawn from the small diameter region $12c$, and the thick shaft portion $12h$ slides with the large diameter region $12p$.

In this case, a length (d0) of the play region $12q$ in the axial direction satisfies d0+d4>d1+d3 if a length from a distal end surface of the thin shaft portion $12f$ to a distal end surface of the thick shaft portion in the axial direction is represented by d3, a length from a distal end surface of the thick shaft portion $12h$ to a sealing position of the seal member $12k$ is represented by d1, and a distance to a sealing position of the seal member $12g$ in the small diameter region $12c$ is represented by d4.

Figure 9:
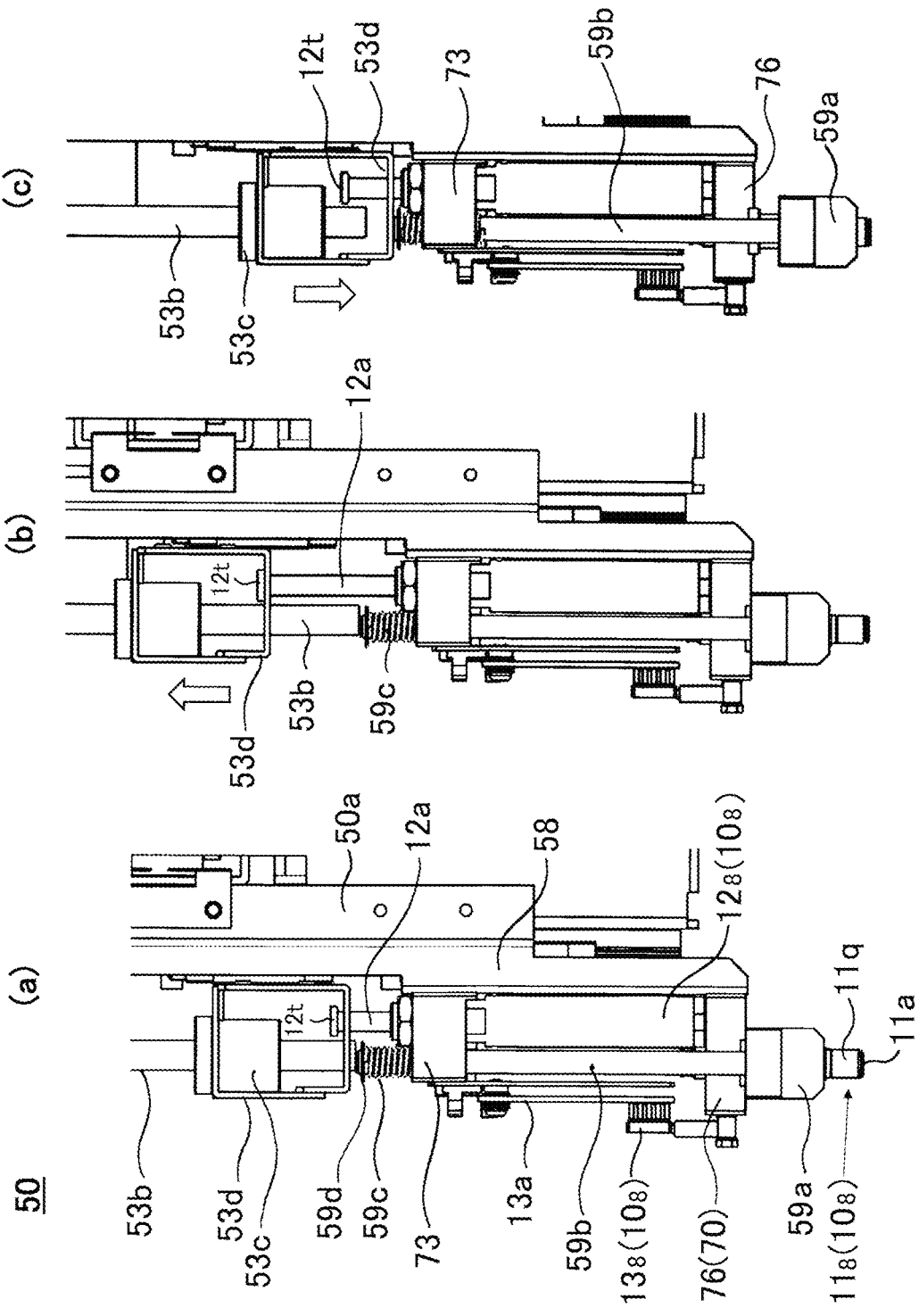
FIG. 9 is a cross-sectional view of a dispensing cylinder of the photometric dispensing nozzle unit according to the first embodiment of the present invention.

FIG. 9 illustrates in detail the suction/discharge driving unit 53 and the tip removing mechanism 59 for the dispensing cylinder $12_8$ of the photometric dispensing nozzle unit $10_8$ and illustrates operation thereof.

FIG. 9($a$) illustrates a state where the plunger $12a$ of the dispensing cylinder $12_8$ is at a bottom dead center of a stroke thereof. The suction/discharge driving member $53d$ of the suction/discharge driving unit 53 is not engaged with the flange $12t$ of the plunger $12a$ and is located below the flange $12t$. The position of the suction/discharge driving member $53d$ is above the head $59d$ of the inject pin $59b$ of the tip removing mechanism 59 and is not in contact with the head $59d$. Therefore, the tip removing member $59a$ is biased upward by the spring $59c$, and therefore is located above the distal end portion $11q$ of the nozzle $11_8$.

FIG. 9($b$) illustrates a state where the plunger $12a$ of the dispensing cylinder $12_8$ is raised to suck gas from the distal end opening $11a$ of the nozzle $11_8$, and illustrates a state where the suction/discharge driving member $53d$ of the suction/discharge driving unit 53 is engaged with the flange $12t$ of the plunger $12a$ to raise the plunger $12a$. Therefore, the suction/discharge driving member $53d$ is further separated upward from the head $59d$ of the tip removing mechanism 59. The tip removing member $59a$ is located above the distal end portion $11q$ as in the case of FIG. 9($a$).

FIG. 9($c$) illustrates a state where the suction/discharge driving member $53d$ is further lowered below the position of FIG. 9($a$). In this case, the plunger $12a$ is disengaged from the flange $12t$, and the plunger $12a$ stays at a bottom dead center thereof. However, the suction/discharge driving member $53d$ pushes down the head $59d$ of the tip removing mechanism 59, and therefore pushes down the injection pin $59b$ and the tip removing member $59a$ at a lower end thereof to remove the dispensing tips $211_8$ and $212_8$ that should be attached to the distal end portion $11q$ of the nozzle 11 from the nozzle 11.

Figure 10:
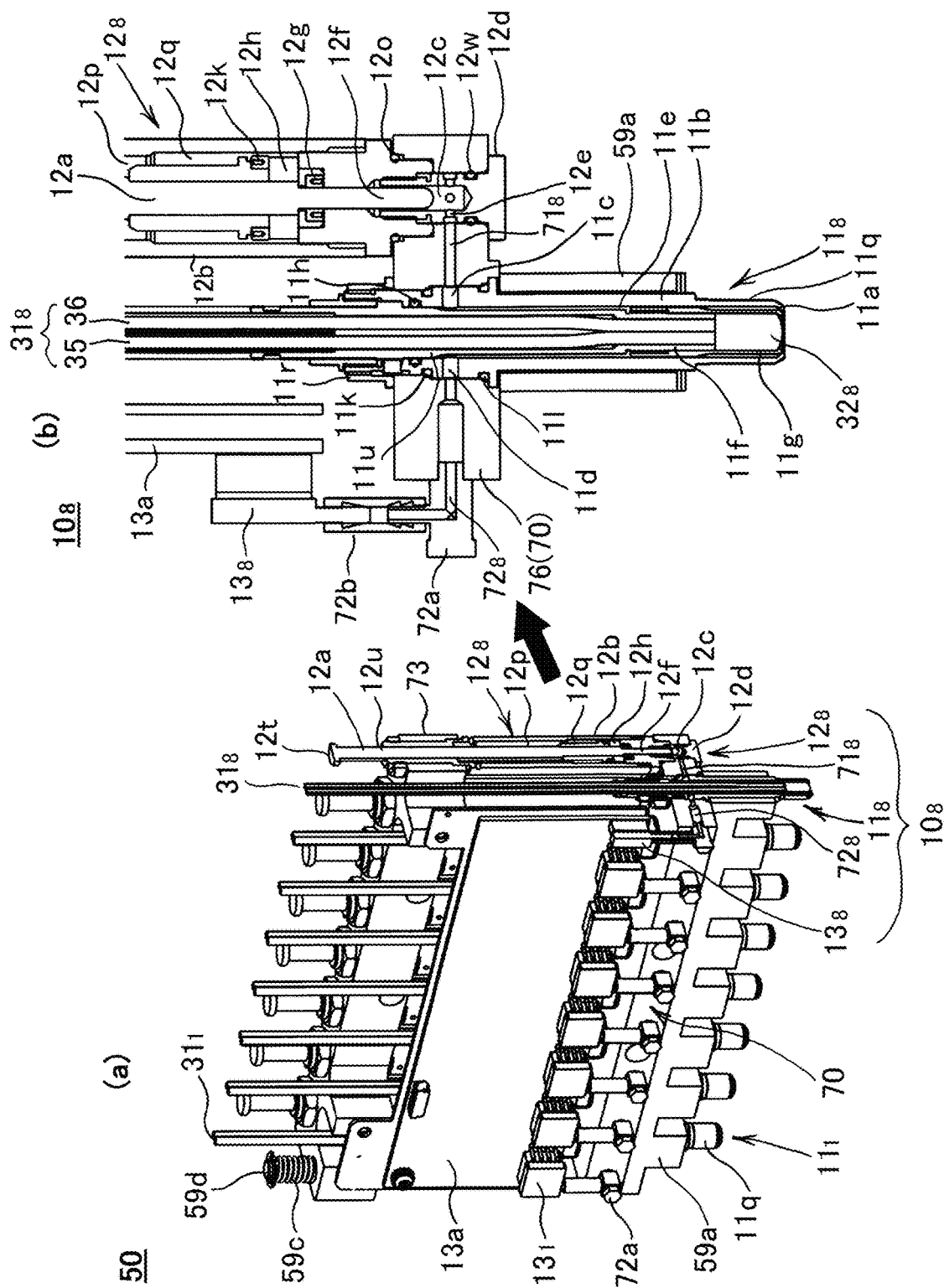
FIG. 10 illustrates a partial cross-sectional perspective view of FIG. 5 and an enlarged cross-sectional side view thereof.

FIGS. 10($a$) and 10($b$) illustrate the nozzle $11_8$, the dispensing cylinder 12, and flow paths $71_8$ and $72_8$ formed in the flow path built-in support body block 76 to which these are attached, forming the photometric dispensing nozzle unit $10_8$ according to the first embodiment of the present invention.

The dispensing cylinder $12_8$ according to the present embodiment includes: a cylinder $12b$ having a cavity ($12c$, $12q$, $12p$) therein; a lower end portion $12d$ attached to a lower end of the cylinder $12b$ and attaching the dispensing cylinder $12_8$ to the flow path built-in support block 76 by being inserted into the cylinder attachment longitudinal hole $75_8$ from a lower side of the flow path built-in support block 76 and screwing with the cylinder $12b$ inserted from an upper side of the cylinder attachment longitudinal hole $75_8$; and a plunger $12a$ provided so as to be slidable in the cavity ($12c$, $12r$, $12q$, $12p$) in the axial direction, located outside the cylinder $12b$, and having a flange $12t$ engaged with the suction/discharge driving member $53d$ driven by a stepping motor or the like.

The cavity ($12c$, $12q$, $12p$) has the large diameter region $12p$ having a large diameter inner peripheral surface and the small diameter region $12c$ formed on the cylinder lateral hole $12e$ side as the suction/discharge port of the large diameter region $12p$ and having a small diameter inner peripheral surface. Here, the small diameter region $12c$ is formed in the lower end portion $12d$, and the cylinder lateral hole $12e$ as the suction/discharge port is bored below the small diameter region $12c$.

A seal member $12o$ is provided at an opening edge of each of the cylinder attachment longitudinal holes $75_1$ to $75_8$ of the flow path built-in support block 76.

Meanwhile, the nozzle $11_8$ is inserted into the nozzle attachment longitudinal hole $74_8$ of the flow path built-in support body 70 from a lower side and is attached by the ring-shaped screw $11g$. Therefore, the dispensing cylinder $12_8$ and the nozzle $11_8$ are detachable independently and supported in parallel.

The nozzle lateral hole $11c$ as the vent hole formed so as to pass through a side wall on which a close-contact surface of the nozzle main body $11b$ of the attached nozzle $11_8$ is formed communicates with the cylinder lateral hole $12e$ as the suction/discharge port through the connecting flow path $71_8$ formed in the flow path built-in support block 76. In the nozzle main body 11, a second nozzle lateral hole $11d$ formed so as to pass through the side wall at a position facing the nozzle lateral hole $11c$ communicates with the pressure sensor flow path $72_8$ formed in the flow path built-in support block 76 and a connecting portion $72b$ to which the pressure sensor $13_8$ is attached.

The cut-out surface 11e formed on an outer peripheral surface of the ferrule unit 11u so as to cut out the outer peripheral surface is formed so as to extend in the axial direction from a distal end side to a position exceeding the nozzle lateral hole 11c but not exceeding the length of the nozzle main body 11b. Also on the opposite side of the axis, a similar cut-out surface is formed so as to extend in the axial direction to a position exceeding the second nozzle lateral hole 11d corresponding to the vent hole but not exceeding the length of the nozzle main body 11b. Therefore, a gap between each of the cut-out surfaces 11e and an inner peripheral surface of the nozzle main body 11b communicate with each of the nozzle lateral holes 11c and the second nozzle lateral holes 11d. Furthermore, the gap communicates with a gap over the entire periphery surrounded by an outer peripheral surface of the lens holding tube 11g and the inner peripheral surface of the nozzle main body 11b, and therefore communicates with the distal end opening 11a. The gap corresponds to the gap portion. Therefore, a flow path communicating with a portion from the distal end opening 11a to a gap in the nozzle main body 11b, the nozzle lateral hole 11c, the connecting flow path $71_8$, and the cylinder lateral hole 12e as the suction/discharge port corresponds to a suction/discharge flow path. A partial region of the flow path corresponds to the connecting flow path $71_8$ formed inside the flow path built-in support block 76.

As described above, the lateral holes 11c and 11d are vertically sandwiched by the O-rings 11k and $11_1$ to prevent leakage of gas passing between fitting surfaces and to improve airtightness. In addition, an O-ring 11h is provided along an inner peripheral surface of the nozzle main body 11b in order to prevent gas leakage between the fitting surfaces of the ferrule unit 11u inserted and fitted into the nozzle $11_8$. With the nozzle according to the present embodiment, it is possible to form and fix a flow path easily because the flow path can be formed by not processing the nozzle main body but performing processing so as to cut out an outer peripheral surface of the ferrule unit or the like as the light guide path end fixing member inserted into the inside in an axial direction or a radial direction.

Figure 11:
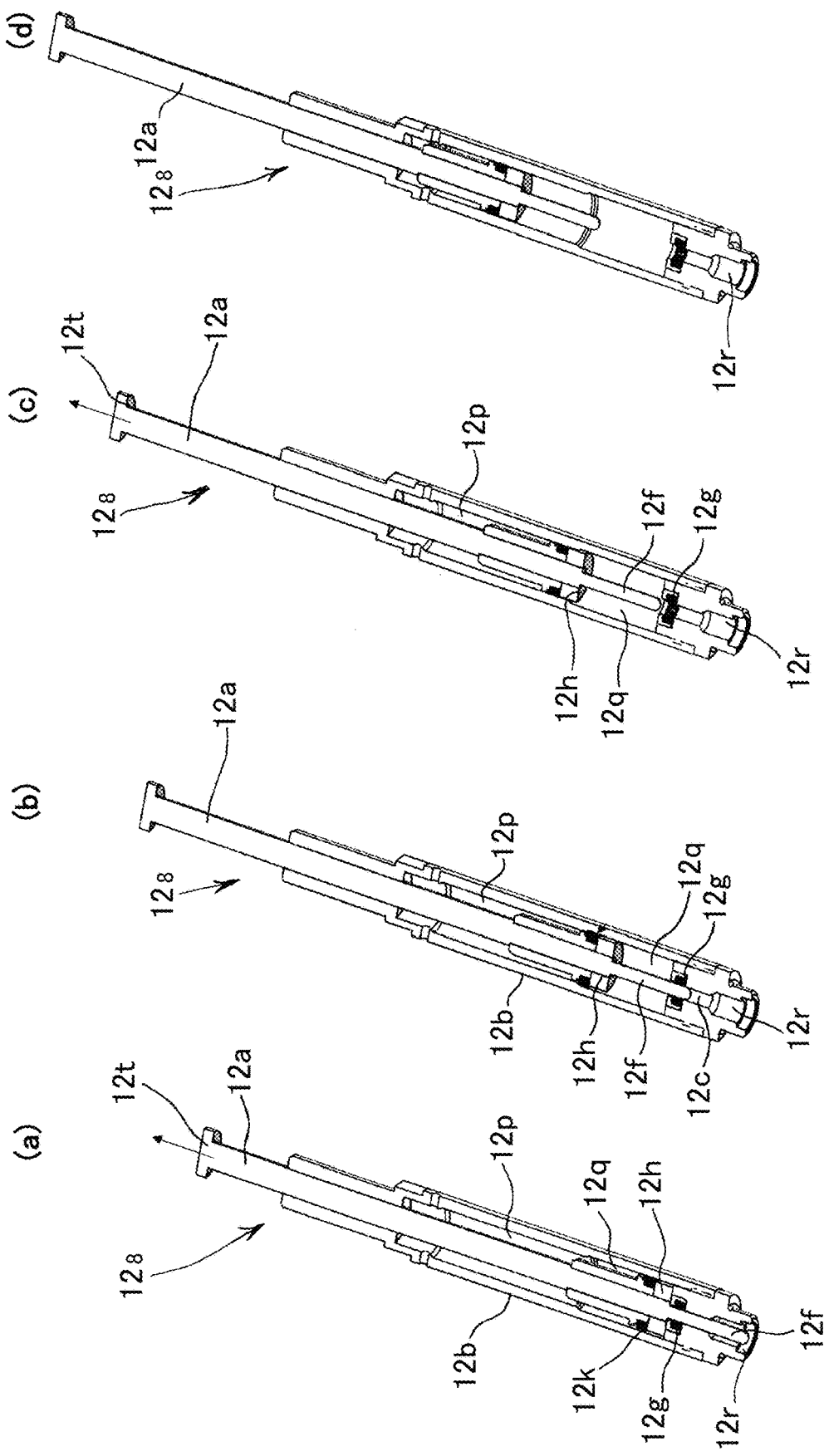
FIG. 11 is a cross-sectional perspective view illustrating operation of the dispensing cylinder according to the first embodiment of the present invention.

FIG. 11 illustrates operation of the dispensing cylinder $12_8$ according to the present embodiment. FIGS. 11(a) and 11(b) illustrate suction operation of a minute amount of liquid.

In FIG. 11(a), a distal end surface of the thick shaft portion 12h is located at a lowermost end of the play region 12q as a bottom dead center of the thick shaft portion 12h, that is, the distal end surface of the thick shaft portion 12h is located at a boundary with the small diameter region 12c. Therefore, the thin shaft portion 12f is inserted into the small diameter region 12c. In this state, distal ends of the dispensing tips 211 and 212 attached to the nozzle 11 are inserted into a container storing liquid.

If a stroke of the thick shaft portion 12h (or plunger 12a) is represented by D, a distance from a bottom dead center of a distal end surface of the thick shaft portion 12h (or plunger 12a) in the axial direction is represented by d, and the length of the seal member (member for sealing gas) of the thin shaft portion 12f in the axial direction is represented by d3, the length d0 of the play region 12q in the axial direction is equal to or larger than the sum of the length d1 from a distal end surface of the thick shaft portion 12h to a sealing position of the seal member in the axial direction and the length d3. As described above, 0≤d≤D, d3<d2, and d3<D are satisfied if the length of the small diameter region 12c including the inside of the lower end portion 12d is represented by d2. Note that the cavity 12r at a lower end of the cylinder 12b is a portion to which the lower end portion 12d is attached by screwing.

In FIG. 11(b), when the plunger 12a is raised by a distance d (<d3) from the bottom dead center, the thin shaft portion 12f slides in the small diameter region 12c and rises by the distance d. The thick shaft portion 12h moves with a play in the play region 12q by the distance d. For this reason, a vacuum portion is not generated by movement of the thick shaft portion 12h. Therefore, a large load is not applied to the plunger 12a, and liquid smoothly flows into the dispensing tips 211 and 212 attached to the nozzle 11 in an amount corresponding to S2×d (S2 represents the cross-sectional area of the small diameter region).

Here, d<d3 in FIGS. 11(a) and 11(b) corresponds to a minute amount suction/discharge section.

In FIG. 11(c), when the plunger 12a is moved from the bottom dead center by a distance d=d3, the thin shaft portion 12f is withdrawn from the small diameter region 12c, the thick shaft portion 12h enters the large diameter region 12p, and suction of gas passing through the distal end opening 11a of the nozzle 11 into the play region 12q and the large diameter region 12p starts.

In FIG. 11(d), when the plunger 12a is moved from the bottom dead center by a distance d (=D>d3), the thin shaft portion 12f moves with a play in the play region 12q, the thick shaft portion 12h slides in the large diameter region 12p, and liquid is sucked into the dispensing tip attached to the nozzle 11 in an amount of S1×(D−d0) (S1 represents the cross-sectional area of the large diameter region perpendicular to the axial direction).

d>d0>d3 in FIGS. 11(c) and 11(d) corresponds to a large amount suction/discharge section.

Figure 12:
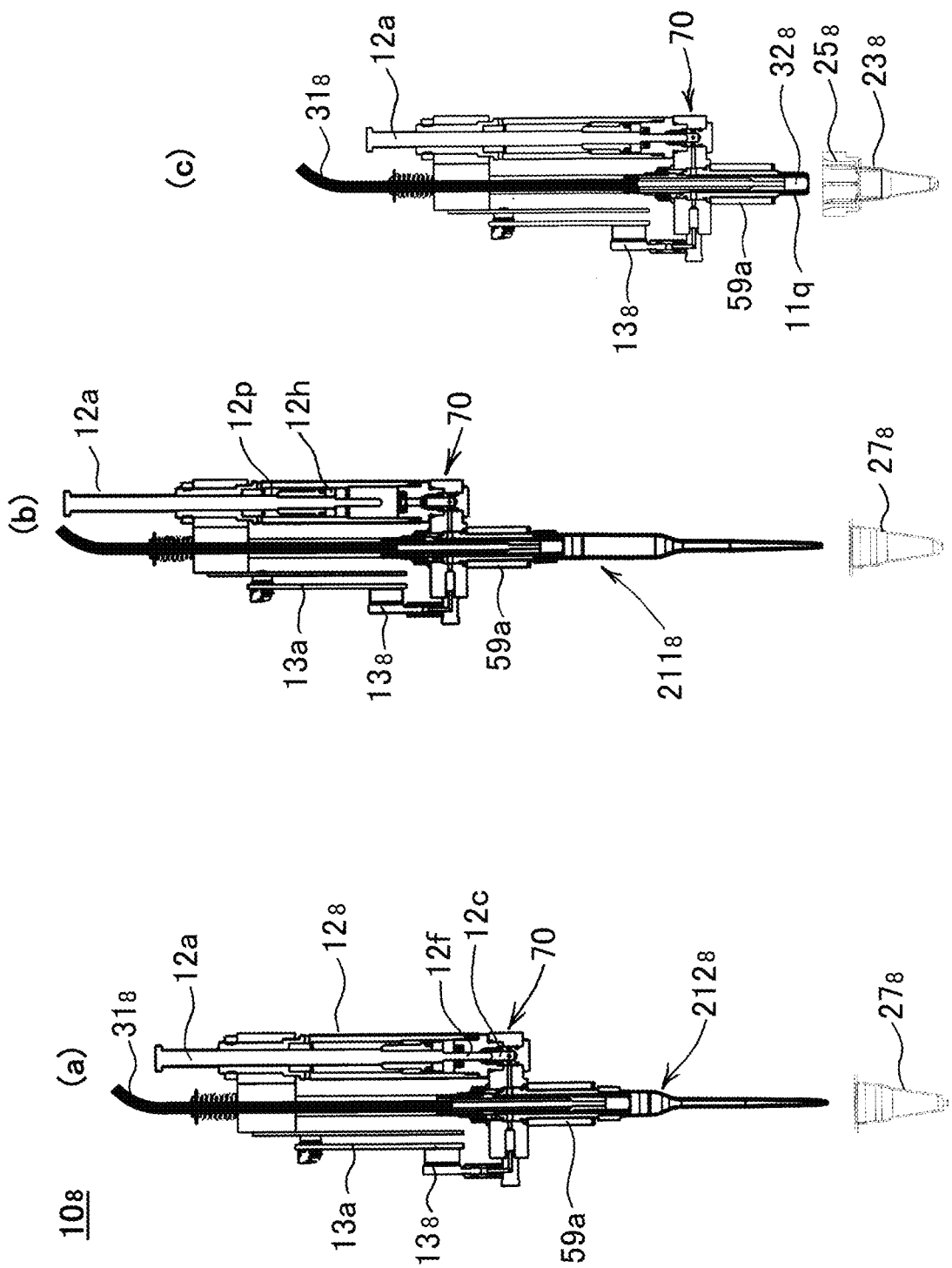
FIG. 12 is an operation explanatory view of the photometric dispensing nozzle unit according to the first embodiment of the present invention.

FIG. 12 is a view for explaining operation of the photometric dispensing nozzle units $10_1$ to $10_n$.

FIG. 12(a) illustrates a state of the photometric dispensing nozzle unit $10_8$ in a case where the minute amount dispensing tip $212_8$ is attached to the distal end portion 11q of the nozzle 11, and suction/discharge of a minute amount of liquid such as a reagent is performed to the liquid storing unit $27_8$ of the container group $20_8$. In the dispensing cylinder $12_8$, the plunger 12a is located in the minute amount suction/discharge section such that the thin shaft portion 12f slides in the small diameter region 12c.

FIG. 12(b) illustrates a state of the photometric dispensing nozzle unit $10_8$ in a case where the large amount dispensing tip $211_8$ is attached to the distal end portion 11q of the nozzle 11, and suction/discharge of a large amount of liquid such as a reagent is performed to the liquid storing unit $27_8$ of the container group $20_8$. In the dispensing cylinder $12_8$, the plunger 12a is located in the large amount suction/discharge section such that the thick shaft portion 12h slides in the large diameter region 12p.

FIG. 12(c) illustrates that a dispensing tip is removed from the distal end portion 11q of the nozzle $11_8$ using the tip removing member 59a, then the nozzle distal end portion 11q is connected to an opening of the reaction container 238 or connected thereto through a sealing lid, and an optical state in the reaction container is detected.

Figure 13:
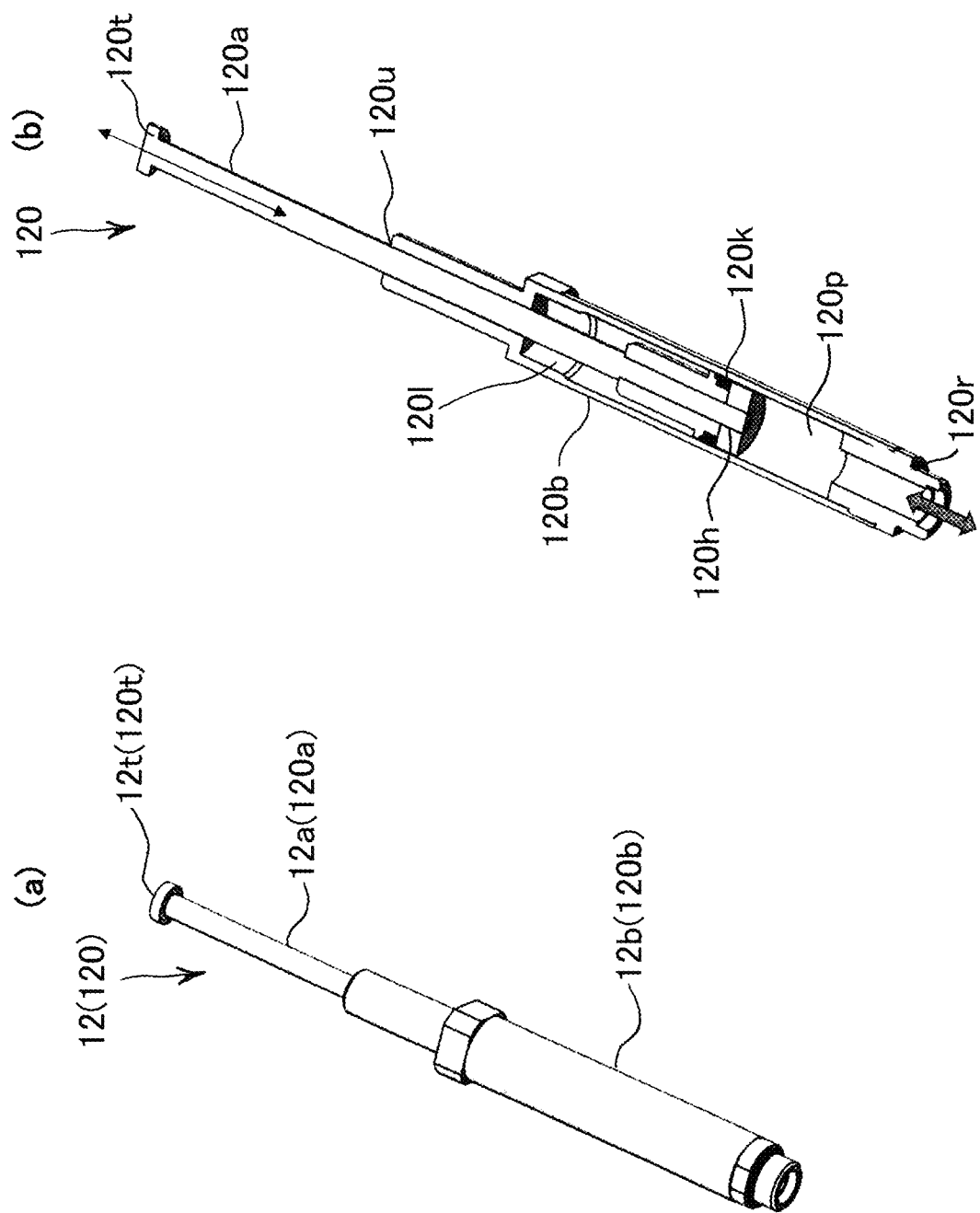
FIG. 13 illustrates a perspective view of a dispensing cylinder of a photometric dispensing nozzle unit according to a second embodiment of the present invention and a cross-sectional perspective view thereof.

FIG. 13 illustrates that, in the photometric dispensing nozzle unit $10_8$, the dispensing cylinder 120 for large amount suction/discharge can be used instead of the dispensing cylinder 12 while the nozzle 11 is as it is with respect to the flow path built-in support block 76. That is, in accordance with a purpose of a test, it is possible to exchange only the dispensing cylinder for an optimal one while the nozzle 11 is as it is. The dispensing cylinder 120 includes: a cylinder 120b having a cavity (120r, 120p) therein; a lower end portion 12d (see FIG. 10) located at a lower end of the cylinder 120b, having a cylinder lateral hole 120e as a gas suction/discharge port, and attaching the dispensing cylinder 120$_8$ to the flow path built-in support block 76 by being inserted into the cylinder attachment longitudinal hole 75$_8$ from a lower side of the flow path built-in support block 76 and screwing with the cylinder 120b inserted from an upper side of the cylinder attachment longitudinal hole 75$_8$; and a plunger 120a provided so as to be slidable in the cavity (120r, 120p) in the axial direction, located outside the cylinder 120b, and having a flange 120t engaged with the suction/discharge driving member 53d (see FIG. 9) driven by a stepping motor or the like.

The cavity (120r, 120p) formed in the cylinder 120b is a large diameter region 120p having a large diameter inner peripheral surface and a cavity 120r into which the lower end portion 12d is inserted to be attached (see FIG. 10).

The plunger 120a has a thick shaft portion 120h provided so as to be slidable in the large diameter region 120p of the cylinder 120b through an opening 120u provided at the other end of the cylinder 120b. Note that a reference numeral 120k represents a seal member provided in a peripheral direction on an outer peripheral surface of the thick shaft portion 120h.

The dispensing cylinder 120 includes a coiled spring (not illustrated) having one end attached to an annular groove 120l bored in an upper end surface of the large diameter region 120p, and having the other end wound around the plunger 120a so as to stretch the thick shaft portion 120h. The thick shaft portion 120h is pressed against a step at a boundary with the cavity 120r which is a bottom dead center. The step protrudes in an inward direction toward the lower direction. FIGS. 13(a) and 13(b) illustrate a state in which the plunger 120a is raised, and the thick shaft portion 120h slides with the large diameter region 120p. Note that FIG. 13(a) illustrates the outer shape of the dispensing cylinder 120, which is similar to the outer shape of the dispensing cylinder 12.

Subsequently, regarding operation of the photometric dispensing apparatus 100 according to the present example, a series of treatment operations until real-time PCR of a nucleic acid of a specimen containing bacteria and light measurement thereof are performed will be described below.

In step S1, on the stage 20, the cartridge containers 205 and 206 storing specimens to be tested, the cartridge container 207 capable of storing residual liquid, the cartridge container 201$_1$ storing various tips, the cartridge container 202$_1$ in which various cleaning liquids for extracting a nucleic acid and various reagents are prepacked, the cartridge container 203$_1$ in which a nucleic acid amplification reagent is prepacked, and the cartridge container 204$_i$ having a PCR tube for amplifying a nucleic acid as the reaction container 23$_i$ and storing the sealing lid 25 are loaded. In addition, the eight sets of photometric dispensing nozzle units 10$_i$ are attached to the flow path built-in support block 76.

In step S2, by touching a touch panel or the like as the operation panel 65, an instruction to start a separation/extraction treatment and an amplification treatment is made.

In step S3, an extraction control unit 62 provided in the CPU+program+memory 60 as the photometric dispensing control unit of the photometric dispensing apparatus 100 instructs the nozzle head moving mechanism 51 to move the nozzle head 50 in the Y-axis direction to locate the nozzle head 50 in a corresponding tip or the like storing unit 21$_i$ of a cartridge container 201$_i$ of each of the container groups 20$_i$. A piercing tip is attached to the nozzle 11 by the nozzle Z-axis moving mechanism 58. The nozzle head 50 is further moved in the Y-axis direction to locate the piercing tip above the first liquid storing unit of the liquid storing unit group 27$_i$ of the container group, and the nozzle is lowered by the nozzle Z-axis moving mechanism 58 to pierce a film covering an opening of the liquid storing unit. Similarly, the nozzle head 50 is moved in the X-axis direction to sequentially perform piercing also for the other liquid storing units of the liquid storing unit group 27$_i$ and the reaction container group 23$_i$, and the piercing tip is detached into the tip or the like storing unit 21$_i$ by the tip removing mechanism 59.

In step S4, the nozzle head 50 is again moved in the X-axis direction and moved to a tip or the like storing unit group 21$_i$. The nozzle 11$_i$ is lowered by the nozzle Z-axis moving mechanism 58, and the large amount dispensing tip 211$_1$ is attached thereto. Next, the dispensing tip 211$_1$ is raised by the nozzle Z-axis moving mechanism 58 and then moved along the X-axis by the nozzle head moving mechanism 51 to reach the eighth liquid storing unit 27$_i$ of the liquid storing unit group 27$_i$, and a predetermined amount of isopropanol is sucked from the liquid storing unit 27$_i$. The dispensing tip 211$_1$ is moved again along the X-axis, and dispensing is performed into a solution component (NaCl, SDS solution) stored in each of the third and fifth liquid storing units 27$_i$ and distilled water stored in the sixth liquid storing unit 27$_1$ in a predetermined amount. As a result, 500 µL of a binding buffer solution (NaCl, SDS, isopropanol), 700 µL of cleaning liquid 1 (NaCl, SDS, isopropanol), and 700 µL of cleaning liquid 2 (water: 50%, isopropanol: 50%) are prepared in the third, fifth, and sixth liquid storing units 27$_1$ as separation/extraction solutions, respectively. At this time, the minute amount/large amount judgement and instruction means 64 judges that the predetermined amount is a large amount based on the instruction from the extraction control unit 62, and the thick shaft portion 12h is located in the large amount suction/discharge section to slide the large diameter region 12p by a distance D corresponding to the predetermined amount.

In step S5, the dispensing tip 211$_1$ is moved to a sample tube 261 storing a specimen. Thereafter, the small diameter portion 211$_i$a of the dispensing tip 211$_1$ is lowered and inserted thereinto using the nozzle Z-axis moving mechanism 58, and the suction/discharge driving member 53d of the suction/discharge driving unit 53 is raised and lowered. Suction/discharge of a suspension of the specimen stored in the sample tube 26$_i$ is thereby repeated to make the specimen suspended in the liquid. Thereafter, the specimen suspension is sucked into the dispensing tip 211$_1$. The specimen suspension is moved to the first liquid storing unit of the liquid storing unit group 27$_1$ storing Lysis 1 (enzyme) as a separation/extraction solution along the X-axis by the nozzle head moving mechanism 51. The small diameter portion 211$_i$a of the dispensing tip 211$_i$ is inserted thereinto through a hole of a pierced film, and suction/discharge is repeated in order to stir the specimen suspension and the Lysis 1.

In step S6, the whole amount of the stirred liquid is sucked by the dispensing tip 211$_1$ to be stored in the reaction container 23$_i$ including a reaction tube held in the storing hole set at 12° C. by a temperature controller 29, and is incubated. As a result, a protein contained in the specimen is destroyed to reduce the molecular weight thereof. After a lapse of a predetermined time, the dispensing tip 211$_i$ is moved to the second liquid storing unit 27$_i$ of the liquid storing unit 27$_i$ by the nozzle head moving mechanism 51 while the reaction solution is left in the reaction tube. The whole amount of the liquid stored in the second liquid storing unit $27_i$ is sucked using the nozzle Z-axis moving mechanism 58 and the suction/discharge driving unit 53, and transferred by the nozzle head moving mechanism 51 using the dispensing tip $211_1$. The small diameter portion is inserted into the third liquid storing unit $27_i$ through the hole of the film to discharge the reaction solution.

In step S7, a binding buffer solution as a separation/extraction solution stored in the third liquid storing unit $27_i$ and the reaction solution are stirred to further dehydrate a solubilized protein, and a nucleic acid or a fragment thereof is dispersed in the solution.

In step S8, the small diameter portion of the dispensing tip $211_i$ is inserted into the third liquid storing unit $27_i$ through a hole of the film using the dispensing tip $211_i$, and the whole amount is sucked. The dispensing tip $211_i$ is raised by the nozzle Z-axis moving mechanism 58. The reaction solution is transferred to the fourth liquid storing unit $27_i$. A magnetic particle suspension stored in the fourth liquid storing unit $27_i$ and the reaction solution are stirred. A cation structure in which a $Na^+$ ion is bonded to a hydroxy group formed on surfaces of magnetic particles contained in the magnetic particle suspension is formed. Therefore, negatively charged DNA is captured by the magnetic particles.

In step S9, by making a magnet 571 of the magnetic force unit 57 approach the small diameter portion $211_i a$ of the dispensing tip $211_i$, the magnetic particles are adsorbed by an inner wall of the small diameter portion $211_i a$ of the dispensing tip $211_i$. In a state where the magnetic particles are adsorbed by the inner wall of the small diameter portion $211_i a$ of the dispensing tip $211_i$, the dispensing tip $211_i$ is raised by the nozzle Z-axis moving mechanism 58. The dispensing tip $211_i$ is moved from the fourth liquid storing unit $27_i$ to the fifth liquid storing unit $27_i$ using the nozzle head moving mechanism 51, and the small diameter portion $211_i a$ is inserted thereinto through a hole of the film.

In a state where a magnetic force to an inside of the small diameter portion $211_i a$ of the dispensing tip $211_i$ is removed by separating the magnet 571 of the magnetic force unit 57 from the small diameter portion $211_i a$, a cleaning liquid 1 (NaCl, SDS, isopropanol) stored in the fifth liquid storing unit $27i$ is repeatedly sucked and discharged. The magnetic particles are thereby detached from the inner wall and stirred in the cleaning liquid 1, and a protein is thereby cleaned. Thereafter, in a state where the magnetic particles are adsorbed by the inner wall of the small diameter portion $211_i a$ of the dispensing tip $211_i$ by making the magnet 571 of the magnetic force unit 57 again approach the small diameter portion $211_i a$, the dispensing tip $211_i$ is moved from the fifth liquid storing unit $27_i$ to the sixth liquid storing unit $27_i$ by the nozzle head moving mechanism 51.

In step S10, the small diameter portion $211_i a$ of the dispensing tip $211_i$ is inserted through a hole of the film using the nozzle Z-axis moving mechanism 58. In a state where a magnetic force to an inside of the small diameter portion $211_i a$ of the dispensing tip $211_i$ is removed by separating the magnet 571 of the magnetic force unit 57 from the small diameter portion $211_i a$, a cleaning liquid 2 (isopropanol) stored in the sixth liquid storing unit $27_i$ is repeatedly sucked and discharged. The magnetic particles are thereby stirred in the liquid, NaCl and SDS are removed, and a protein is cleaned. Thereafter, in a state where the magnetic particles are adsorbed by the inner wall of the small diameter portion $211_i a$ of the dispensing tip $211_i$ by making the magnet 571 of the magnetic force unit 57 again approach the small diameter portion $211_i a$, the dispensing tip $211_1$ is raised by the nozzle Z-axis moving mechanism 58, and then moved from the sixth liquid storing unit $27_i$ to the seventh liquid storing unit $27_i$ storing distilled water by the nozzle head moving mechanism 51.

In step S11, the small diameter portion $211_i a$ of the dispensing tip $211_i$ is lowered by the nozzle Z-axis moving mechanism 58 through the hole. By repeating suction/discharge of the distilled water at a slow flow rate in a state where the magnetic force is applied to an inside of the small diameter portion $211_i a$ of the dispensing tip $211_i$, the cleaning liquid 2 (isopropanol) is replaced with the water and removed. Thereafter, by sucking and discharging the magnetic particles repeatedly in distilled water as the dissociated solution in a state where the magnet 571 of the magnetic force unit 57 is separated from the small diameter portion $211_i a$ of the dispensing tip $211_i$ and the magnetic force is removed, stirring is performed, and a nucleic acid retained by the magnetic particles or a fragment thereof is dissociated (eluted) from the magnetic particles into the liquid. Thereafter, by making the magnet 571 approach the small diameter portion $211_i a$ of the dispensing tip $211_i$, a magnetic field is applied to an inside of the small diameter portion, the magnetic particles are adsorbed by the inner wall, and the solution containing the extracted nucleic acid or the like is left in the eighth liquid storing unit. The dispensing tip $211_i$ is moved to the storing unit in which the dispensing tip $211_i$ of the tip or the like storing unit group $21_i$ was stored by the nozzle head moving mechanism 51. The dispensing tip $211_i$ which has adsorbed the magnetic particles from the nozzle $11_i$ is detached into the storing unit together with the magnetic particles using the removing member 591 of the tip removing mechanism 59.

Subsequent steps S12 to S15 correspond to a nucleic acid amplification step.

In step S12, based on the instruction from the nucleic acid amplification control unit 63, according to the instruction from the minute amount/large amount judgement and instruction means 64, a new minute amount dispensing tip $212_i$ is attached to the nozzle $11_i$ using the nozzle head moving mechanism 51 and the nozzle Z-axis moving mechanism 58. A minute amount of the solution containing a nucleic acid or the like stored in the eighth liquid storing unit $27_i$ is sucked, transferred to a PCR tube as the reaction container $23\pm$storing an amplification solution in advance, discharged, and introduced into the container.

In step S13, the minute amount dispensing tip $212i$ attached to the nozzle $11_i$ by the nozzle head moving mechanism 51, the nozzle Z-axis moving mechanism 58, and the tip removing mechanism 58 is detached into the tip or the like storing unit $21_i$. The nozzle head 50 is moved by the nozzle head moving mechanism 51, and the nozzle $11_i$ is moved to an upper portion of the sealing lid storing unit as the tip or the like storing unit $21_i$ storing the sealing lid $25_i$ of the container group 20. By lowering the nozzle $11_i$ using the nozzle Z-axis moving mechanism 58, a depression $258_i$ on an upper side of the sealing lid $25_i$ is fitted to the distal end portion $11q$ of the nozzle $11_i$ and attached thereto. After raising the nozzle $11_i$ by the nozzle Z-axis moving mechanism 58, the sealing lid $25_i$ is located on the PCR tube ($23_i$) using the nozzle head moving mechanism 51. The sealing lid $25_i$ is lowered by the nozzle Z-axis moving mechanism 58, fitted to an opening of the PCR tube $231_i$, and is attached and sealed.

In step S14, the photometric control unit 61 instructs the nozzle head moving mechanism 51 to move the nozzle head 50 along the X-axis, thereby locates the nozzle $11_i$ above the PCR tube ($23_i$) to which the sealing lid $25_i$ is attached, and lowers the nozzle $11_i$ by the Z-axis moving mechanism 58. As a result, the distal end portion $11q$ of the nozzle 11 is attached to the inside of the depression of the sealing lid $25_i$, and the lower end portion $11q$ of the nozzle 11 is brought into contact or close contact with the bottom of the depression.

At this time, in step S15, the nucleic acid amplification control unit 63 instructs the temperature controller 29 to repeat a temperature control cycle by real time PCR, for example, a cycle of heating the PCR tube ($23_i$) at 96° C. for five seconds and heating the PCR tube ($23_i$) at 60° C. for 15 seconds, for example, 49 times.

In step S16, when temperature control in each cycle is started by the nucleic acid amplification control unit 63, the photometric control unit 61 determines start of an extension reaction step in each cycle, and instructs each measurement end $44j$ of the measuring device 40 to move the connection end array 30 continuously or intermittently. The moving speed is calculated based on stable light receivable time, a fluorescence lifetime, the number of the container groups $20_i$ (eight in this example), and the like. As a result, light reception from the eight PCR tubes ($23_i$) in total within the stable light receivable time is completed. Here, the "stable light receivable time" is time during which a light receivable optical state in the reaction container is stably maintained. For example, in a case of a TaqMan probe in an intercalation method of real-time PCR, a LUX method, or a hybridization method, time during which an extension reaction of each cycle of PCR is performed corresponds thereto. Note that in a case where a FRET probe is used in the hybridization method, time during which annealing is performed corresponds thereto.

In step S17, the photometric control unit 61 determines, for example, the timing of optical connection between the optical fiber (bundle) $31_i$ of the nozzle $11_i$ and each of a first measurement end (irradiation port of excitation light) of the measurement end 44 and a second measurement end (emission port of emitted light) thereof, and instructs the measuring device 40 to receive light.

This measurement is performed on a cycle in which exponential amplification is performed, and an amplification curve is obtained based on the measurement. Various analyses are performed based on the amplification curve. Note that at the time of measurement, the photometric control unit 61 can heat a heater provided in each container group $20_i$ to prevent dew condensation of the sealing lid 25 and can perform clear measurement.

Figure 14:
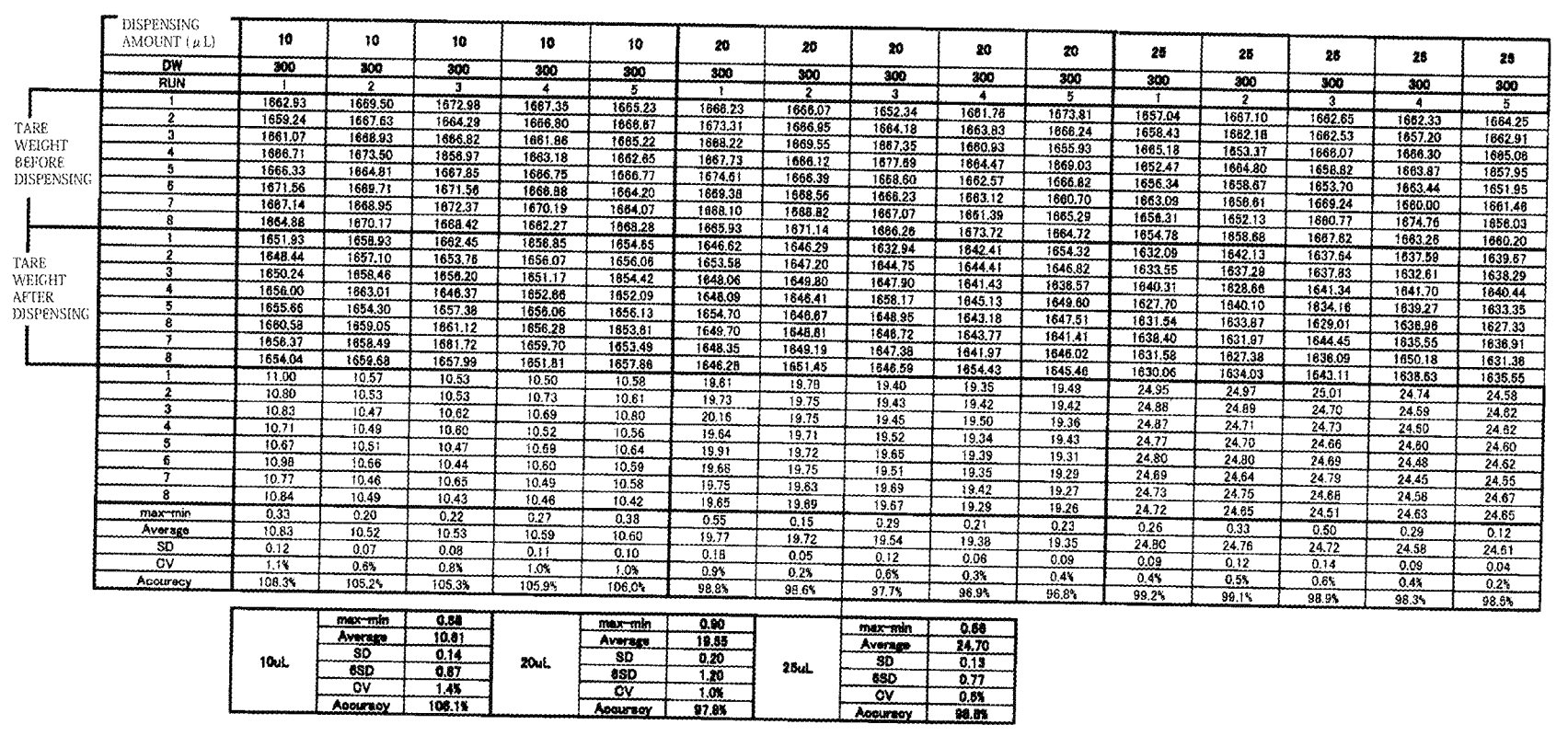

FIG. 14 illustrates an experimental example illustrating performance of the photometric dispensing apparatus according to the present embodiment. This experiment was performed at a room temperature of 20.9° C. and a humidity of 31%. Using the present photometric dispensing apparatus 100, 10 μL, 20 μL, and 25 μL of distilled water were sucked by an already weighed tube. The suction amount in a case of performing dispensing into another container of 1.5 mL volume was determined as a difference between the weight of the already weighed tube before dispensing and the weight of the already weighed tube after suction, measured using the eight photometric dispensing nozzle units for five solutions. A difference between a maximum value and a minimum value (max–min), an average, a deviation (SD), a 6-fold deviation (6SD), a coefficient of variation, and accuracy for the results were measured. As a result, it was indicated that the coefficient of variation of the present photometric dispensing apparatus was sufficiently smaller than those of other dispensing apparatuses of the present applicant (for example, 10% or less for 10 μL, 3% or less for 25 μL, 1.5% or less for 200 μL), and that reliability for dispensing was high.

FIG. 15 illustrates results of measurement of an average value (AVE), a maximum value (MAX), a minimum value (MIN), a deviation (SD), and a coefficient of variation (CV) in a case where eight fluorescence solutions (each having a volume of 20 μl) of the same fluorescence (FITC yellow green) was irradiated with excitation light (Ch0) using the photometric dispensing nozzle unit $11i$ (i=1 to 8) of the photometric dispensing apparatus 100, and an emission amount (AD conversion value) was repeatedly measured five times, and indicates that the coefficient of variation was small and reliability was high. Moreover, a coefficient of variation or the like was simultaneously measured also for the dispensing amount for each lane.

FIG. 16 illustrates results of measuring fluorescence for 20 μL of fluorescence solutions obtained by diluting fluorescence (FITC yellowish green) solutions stored in prepared two containers so as to have three concentrations (0.1, 0.05, 0.025) using six sets (lanes 1 to 6) of the photometric dispensing nozzle units of the photometric dispensing apparatus 100 (lanes 1 to 3→operation 1, lanes 4 to 6→operation 2). The measured results are illustrated as a table (a) of a peak value of fluorescence (digital value obtained by the photoelectric conversion unit), raw data (b) obtained by measurement with the measuring device 40 (obtained as a time change with movement of the connection end array 30), and a calibration curve (c) created. These measurement results indicate that a fluorescence amount according to a concentration can be obtained with high accuracy.

The above-described embodiments have been described specifically for the purpose of better understanding of the present invention, and do not limit another embodiment. Therefore, the above-described embodiments can be modified within a range not changing the gist of the invention. For example, as an example of the photometric dispensing nozzle unit, only the dispensing cylinder 12 according to the first embodiment has been described for the photometric dispensing apparatus and the method thereof. However, needless to say, the dispensing cylinder 120 according to the second embodiment can be used. The numerical values, the numbers of times, the shapes, the numbers of items (for example, the number of sets of the photometric dispensing nozzle units used in the photometric dispensing apparatus is not limited to eight, and may be larger or smaller), the amounts, and the like used in the above description are not limited to these cases. As an example of the light guide end portion of the photometric dispensing nozzle unit, only the case of providing both the irradiation end and the light receiving end in the nozzle unit has been described. However, only one of the irradiation end and the light receiving end may be provided. In this case, the other of the irradiation end and the light receiving end is provided at a position which is outside the photometric dispensing nozzle unit and/or outside the dispensing tip attached to the nozzle, and to an upper portion of which a distal end opening of the nozzle or an opening of the dispensing tip can be located, for example, on a stage. Furthermore, the other is provided under a transparent bottom of the container placed on the stage. In a case where a dispensing tip is attached to the nozzle, both the irradiation end and the light receiving end are preferably provided in a positionable manner so as to be located on a vertical common axis commonly passing through the opening of the dispensing tip attached to the nozzle and the attachment opening.

INDUSTRIAL APPLICABILITY

The present invention relates to a photometric dispensing nozzle unit, a photometric dispensing apparatus, and a photometric dispensing method, performs a test of a specimen collected from a patient or the like, optical measurement thereof, and recording thereof, and can be used particularly in a field requiring handling of a biopolymer and a low molecular biological substance such as a gene, an immune system, an amino acid, a protein, or a sugar, for example, in a biochemistry field, an industrial field, an agriculture field such as food, agriculture, or fishery processing, a pharmaceutical field, and a medical field such as hygiene, health, immunity, diseases, or genetics.

REFERENCE SIGNS LIST $10_1$ to $10_n$ (n=1, ... 8, ...) Photometric dispensing nozzle unit
$11_1$ to $11_n$ (n=1, ... 8, ...) Nozzle
$12_1$ to $12_n$ (n=1, ... 8, ...) Dispensing cylinder
$13_1$ to $13_n$ (n=1, ... 8, ...) Pressure sensor
20 Stage
$20_1$ to $20_n$ (n=1, ... 8, ...) Container group
29 Temperature controller
40 Light measuring device
50 Nozzle head
51 Nozzle head moving mechanism
53 Suction/discharge driving unit
57 Magnetic force unit
58 Nozzle Z-axis moving mechanism
59 Tip removing mechanism
60 CPU+program+memory (photometric dispensing control unit)
70 Flow path built-in support body
$71_1$ to $71_n$ (n=1, ... 8, ...) Connecting flow path (suction/discharge flow path)
$72_1$ to $72_n$ (n=1, ... 8, ...) Pressure sensor flow path
100 Photometric dispensing apparatus

The invention claimed is:

1. A photometric dispensing nozzle unit comprising:
a nozzle having a distal end opening through which suction/discharge of gas is performed and to which a dispensing tip is attached;
a light guide end portion which is provided in the nozzle and in which light is received or irradiated at a distal end of the nozzle;
a dispensing cylinder including a cylinder having a cavity therein, a plunger that is slidable in the cavity, and a suction/discharge port through which suction/discharge of gas is performed;
a suction/discharge flow path that passes through the nozzle and allows the suction/discharge port to communicate with the distal end opening of the nozzle; and
a light guide path optically connected to the light guide end portion through the nozzle without through the dispensing cylinder.

2. The photometric dispensing nozzle unit according to claim 1, further comprising a flow path built-in support member in which the nozzle and the dispensing cylinder are independently and detachably attached and supported in parallel a partial region of the suction/discharge flow path is formed therein.

3. The photometric dispensing nozzle unit according to claim 2, wherein the nozzle has a nozzle lateral hole formed through a side wall thereof, the suction/discharge port is a cylinder lateral hole formed through a side wall of the cylinder, and the partial region of the suction/discharge flow path has a connecting flow path formed so as to allow the nozzle lateral hole of the nozzle attached to the flow path built-in support member to communicate with the cylinder lateral hole of the dispensing cylinder attached to the flow path built-in support member.

4. The photometric dispensing nozzle unit according to claim 3, wherein the flow path built-in support member includes:
a flow path built-in support block;
a nozzle attachment longitudinal hole and a cylinder attachment longitudinal hole bored in the flow path built-in support block; and
the connecting flow path formed in the flow path built-in support block and allowing the nozzle attachment longitudinal hole to communicate with the cylinder attachment longitudinal hole, the nozzle is closely attached to the nozzle attachment longitudinal hole, the dispensing cylinder is closely attached to the cylinder attachment longitudinal hole, and the connecting flow path allows the nozzle lateral hole of the attached nozzle to communicate with the cylinder lateral hole of the attached dispensing cylinder.

5. The photometric dispensing nozzle unit according to claim 4, wherein any one of close contact surfaces between the nozzles and the nozzle attachment longitudinal holes and any one of close contact surfaces between the dispensing cylinders and the cylinder attachment longitudinal holes each have a seal member vertically partitioning each of the close contact surfaces so as to sandwich the cylinder lateral holes and the nozzle lateral holes at upper and lower positions.

6. The photometric dispensing nozzle unit according to claim 3, further comprising a pressure sensor communicating with the distal end opening of the nozzle, wherein the side wall of the nozzle has a second nozzle lateral hole passing through the side wall, the pressure sensor communicates with the distal end opening through the second nozzle lateral hole, the flow path built-in support block of the flow path built-in support member further has a pressure sensor attachment hole with which the pressure sensor is independently and detachably attached, and a pressure sensor flow path allowing the attached pressure sensor to communicate with the second nozzle lateral hole is formed.

7. The photometric dispensing nozzle unit according to claim 1, wherein the cavity of the dispensing cylinder has a large diameter region having a large diameter inner peripheral surface, and a small diameter region formed on the suction/discharge port side of the large diameter region and having a small diameter inner peripheral surface, the plunger has a thick shaft portion that is slidable in the large diameter region, and a thin shaft portion that protrudes from a distal end surface of the thick shaft portion in the axial direction and is slidable in the small diameter region, a play region in which the thick shaft portion is configured to move with a play in the axial direction is formed between the large diameter region and the small diameter region, and the suction/discharge port is formed so as to be located in a cavity ahead of the small diameter region.

8. A photometric dispensing apparatus comprising:
one or more container groups each including a reaction container, and a liquid storing unit or a dispensing tip storing unit;
one or more photometric dispensing nozzle units each including: a nozzle which performs suction/discharge of gas through a distal end opening and to which a dispensing tip is attached, a dispensing cylinder including a cylinder having a cavity therein and a plunger that slides in the cavity and having a gas suction/discharge port, and a suction/discharge flow path allowing the suction/discharge port to communicate with the distal end opening through the nozzle;

a nozzle moving mechanism that is configured to move the nozzle relatively to the container groups;

a suction/discharge driving unit that moves the plunger of the dispensing cylinder in a vertical direction and makes it possible for the dispensing tip attached to the nozzle to simultaneously suction liquid from the container groups and to simultaneously discharge liquid to the container groups;

a light measuring device that converts at least received light into digital data; and a photometric dispensing control unit that controls a dispensing treatment or a photometric treatment for the nozzle moving mechanism, the suction/discharge driving unit, and the light measuring device, wherein the nozzle has a light guide end portion capable of receiving or irradiating light at a distal end of the nozzle, and a light guide path optically connected to the light guide end portion through the nozzle without through the dispensing cylinder, and the light measuring device is optically connected to the light guide path.

9. The photometric dispensing apparatus according to claim 8, wherein each of the one or more sets of photometric dispensing nozzle units further includes a flow path built-in support body in which the nozzle and the dispensing cylinder are independently and detachably attached and supported in parallel, and a partial region of the suction/discharge flow path is formed therein.

10. The photometric dispensing apparatus according to claim 9, wherein the nozzle has a nozzle lateral hole formed through a side wall thereof, the suction/discharge port is a cylinder lateral hole formed through a side wall of the cylinder, and the partial region of the suction/discharge flow path is a connecting flow path allowing the nozzle lateral hole of the nozzle attached to and supported by the flow path built-in support body to communicate with the cylinder lateral hole of the dispensing cylinder attached to the flow path built-in support body and supported thereby so as to face the nozzle lateral hole.

11. The photometric dispensing apparatus according to claim 8, wherein the flow path built-in support body includes:

a flow path built-in support block; one or more sets of a nozzle attachment longitudinal hole and a cylinder attachment longitudinal hole bored in the flow path built-in support block; and the connecting flow path formed in the flow path built-in support block and allowing the nozzle attachment longitudinal hole to communicate with the cylinder attachment longitudinal hole in each of the sets, the nozzle is closely attached to the nozzle attachment longitudinal hole, the dispensing cylinder is closely attached to the cylinder attachment longitudinal hole, and the connecting flow path allows the nozzle lateral hole of the attached nozzle to communicate with the cylinder lateral hole of the attached dispensing cylinder.

12. The photometric dispensing apparatus according to claim 8, wherein the flow path built-in support block of the flow path built-in support body further includes a pressure sensor communicating with the distal end opening of each of the nozzles, the side wall of the nozzle has a second nozzle lateral hole passing through the side wall, the pressure sensor communicates with the distal end opening through the second nozzle lateral hole, the flow path built-in support block further has a pressure sensor attachment hole with which the pressure sensor is independently and detachably attached, and a pressure sensor flow path allowing the attached pressure sensor to communicate with the second nozzle lateral hole is formed.

13. The photometric dispensing apparatus according to claim 8, wherein the cavity of the dispensing cylinder has a large diameter region having a large diameter inner peripheral surface and a small diameter region provided on the suction/discharge port side of the large diameter region and having a small diameter inner peripheral surface, the plunger has a thick shaft portion provided so as to be slidable in the large diameter region and a thin shaft portion protruding from a distal end surface of the thick shaft portion in the axial direction and provided so as to be slidable in the small diameter region, a play region in which the thick shaft portion is configured to move with a play in the axial direction is formed between the large diameter region and the small diameter region, the suction/discharge port is located in a cavity ahead of the small diameter region, the photometric dispensing control unit includes a minute amount/large amount judgement and instruction means that determines, in a case where there is an instruction for suction/discharge of a predetermined amount of liquid to the dispensing tip, whether the predetermined amount is a minute amount or a large amount, and instructs the suction/discharge driving unit to locate the thin shaft portion of the plunger of the dispensing cylinder in a minute amount suction/discharge section in which the thin shaft portion is slidable in the small diameter region and to move the thin shaft portion by a moving distance according to the predetermined amount in a case where the judgement result is a minute amount, and instructs the suction/discharge driving unit to locate the thick shaft portion of the plunger in a large amount suction/discharge section in which the thick shaft portion is slidable in the large diameter region and to move the thick shaft portion by a moving distance according to the predetermined amount in a case where the judgement result is a large amount.

14. A photometric dispensing method comprising:

a moving step of relatively moving nozzles of one or more photometric dispensing nozzle units including the nozzles which perform suction/discharge of gas to one or more container groups each including a reaction container and a liquid storing unit or a dispensing tip storing unit through a distal end opening, and to which dispensing tips are attached, a dispensing cylinder including a cylinder having a cavity therein and a plunger that slides in the cavity and having a gas suction/discharge port, and a suction/discharge flow path allowing the suction/discharge port to communicate with the distal end opening through the nozzles by the nozzle moving mechanism;

an attachment step of attaching the dispensing tips to the nozzles by the nozzle moving mechanism;

a suction/discharge step of simultaneously performing suction/discharge of liquid stored in the container groups to the dispensing tips by the suction/discharge driving unit;

a removal step of removing the dispensing tips from the nozzles; and a light measuring step of performing measurement by connecting distal end portions of the nozzles to an opening of the reaction container directly or indirectly by the nozzle moving mechanism, and optically connecting a light measuring device with the reaction container through a light guide path optically connected to a light guide end portion formed in the nozzles through the nozzles without through the light guide end portion or the dispensing cylinder.

15. The photometric dispensing method according to claim 14, wherein each of the one or more sets of photometric dispensing nozzle units includes a flow path built-in support body in which the nozzle and the dispensing cylinder are independently and detachably attached and supported in parallel, and a partial region of the suction/discharge flow path is formed therein, and the method further comprises a nozzle unit attachment step of attaching the nozzles and the dispensing cylinders to the flow path built-in support body.

16. The photometric dispensing method according to claim 14, wherein the cavity of the dispensing cylinder has a large diameter region having a large diameter inner peripheral surface and a small diameter region provided on the suction/discharge port side of the large diameter region and having a small diameter inner peripheral surface, the plunger has a thick shaft portion provided so as to be slidable in the large diameter region and a thin shaft portion protruding from a distal end surface of the thick shaft portion in the axial direction and provided so as to be slidable in the small diameter region, a play region in which the thick shaft portion is configured to move with a play in the axial direction is formed between the large diameter region and the small diameter region, and the suction/discharge port is located in a cavity ahead of the small diameter region, the photometric dispensing method further comprises a judgement step of judging whether a predetermined amount is a minute amount or a large amount when suction/discharge of the predetermined amount of liquid is instructed to the dispensing tip, in the attachment step, a minute amount dispensing tip is attached in a case where the predetermined amount is judged to be a minute amount, and a large amount dispensing tip is attached to the nozzle in a case where the predetermined amount is judged to be a large amount, and the suction/discharge step includes:
a minute amount suction/discharge step of causing the dispensing tips to perform suction/discharge of the minute amount of liquid by locating the thin shaft portion of the plunger of the dispensing cylinder in a minute amount suction/discharge section in which the thin shaft portion is slidable in the small diameter region and sliding the thin shaft portion by a distance according to the predetermined amount in a case where the predetermined amount is judged to be a minute amount; and a large amount suction/discharge step of causing the dispensing tips to perform suction/discharge of the large amount of liquid by locating the thick shaft portion of the plunger in a large amount suction/discharge section in which the thick shaft portion is slidable in the large diameter region and sliding the thick shaft portion by a distance according to the predetermined amount in a case where the predetermined amount is judged to be a large amount.

* * * * *